(12) United States Patent
Song et al.

(10) Patent No.: US 9,471,961 B2
(45) Date of Patent: Oct. 18, 2016

(54) METHOD FOR ROTATING AN ORIGINAL IMAGE USING SELF-LEARNING AND APPARATUSES PERFORMING THE METHOD

(71) Applicants: Min Woo Song, Seoul (KR); Min Soo Kim, Suwon-si (KR); Sung Chul Yoon, Hwaseong-si (KR); Jae Young Hur, Hwaseong-si (KR); Sung Min Hong, Hwaseong-si (KR)

(72) Inventors: Min Woo Song, Seoul (KR); Min Soo Kim, Suwon-si (KR); Sung Chul Yoon, Hwaseong-si (KR); Jae Young Hur, Hwaseong-si (KR); Sung Min Hong, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 239 days.

(21) Appl. No.: 14/186,042

(22) Filed: Feb. 21, 2014

(65) Prior Publication Data

US 2014/0240360 A1  Aug. 28, 2014

(30) Foreign Application Priority Data

Feb. 28, 2013 (KR) .................. 10-2013-0022159

(51) Int. Cl.
*G06T 3/60* (2006.01)
*G06T 1/60* (2006.01)

(52) U.S. Cl.
CPC .............. *G06T 3/606* (2013.01); *G06T 1/60* (2013.01); *G06T 3/602* (2013.01)

(58) Field of Classification Search
None
See application file for complete search history.

(56) References Cited

U.S. PATENT DOCUMENTS 4,943,908 A  7/1990 Emma et al.
5,305,389 A  4/1994 Palmer
(Continued)

FOREIGN PATENT DOCUMENTS

EP  0318778 A2  6/1989
JP  07325753  12/1995
(Continued)

OTHER PUBLICATIONS

Jean-Loup Baer, Tien-Fu Chen An Effective On-Chip Preloading Scheme to Reduce Data Access Penalty, 1991, University of Washington.*

(Continued)

*Primary Examiner* — Mark Zimmerman
*Assistant Examiner* — Yu-Jang Tswei
(74) *Attorney, Agent, or Firm* — Harness, Dickey & Pierce, P.L.C.

(57) ABSTRACT

A method of rotating an original image includes performing a self-learning using addresses related to at least one page miss and generating address generation rules using a result of the self-learning. The method includes pre-fetching the original image from a memory device based on the address generation rules to obtain a pre-fetched image and generating a rotated image using the pre-fetched image.

20 Claims, 20 Drawing Sheets

| Address Generation Rule # | Page Miss Position | Address Difference (Depth Value) |
|---|---|---|
| 1 | 1 | −1(=D4⇒D3) |
| 2 | 4 | +7(=D1⇒D8) |
| 3 | − | − |

(56) References Cited

U.S. PATENT DOCUMENTS

| | | | |
|---|---|---|---|
| 5,793,901 A * | 8/1998 | Matsutake | G06T 7/0046 |
| | | | 382/151 |
| 6,226,016 B1 | 5/2001 | Chee et al. | |
| 6,560,693 B1 | 5/2003 | Puzak et al. | |
| 6,633,968 B2 | 10/2003 | Zwiegincew et al. | |
| 6,643,415 B1 | 11/2003 | Fukai et al. | |
| 7,971,253 B1 | 6/2011 | Gupta | |
| 8,195,917 B2 * | 6/2012 | Hohmuth | G06F 12/1009 |
| | | | 711/206 |
| 2005/0275665 A1 | 12/2005 | Kejser | |
| 2006/0033966 A1 * | 2/2006 | Yamamoto | H04N 5/23248 |
| | | | 358/474 |
| 2006/0236012 A1 | 10/2006 | Hayashi | |
| 2010/0079470 A1 * | 4/2010 | Nishi | G06T 11/40 |
| | | | 345/519 |
| 2011/0219208 A1 * | 9/2011 | Asaad | G06F 15/76 |
| | | | 712/12 |
| 2012/0038952 A1 | 2/2012 | Cho | |
| 2013/0135351 A1 * | 5/2013 | Tripathi | G06T 3/606 |
| | | | 345/649 |

FOREIGN PATENT DOCUMENTS

| | | |
|---|---|---|
| JP | 2001103292 A | 4/2001 |
| JP | 2004072600 A | 3/2004 |

OTHER PUBLICATIONS

Vanderwiel et al. "Data Prefetch Mechanism," *ACM Computing Surveys*, 32(2), 2000. XP002977351.

Chen et al. "Effective hardware-based data prefetching for high-performance processors," *IEEE Transactions on Computers*, 44(5), 1995. XP000525553.

Baer et al., "An effective on-chip preloading scheme to reduce data access penalty," *ACM*, 1991. XP31577282.

European Search Report dated Nov. 24, 2014 for corresponding Dutch Application No. 2012319.

* cited by examiner

FIG. 2

| | | | | | | 121 |
|---|---|---|---|---|---|---|
| D16 | P | D32 | f | D48 | v | |
| D15 | O | D31 | e | D47 | u | |
| D14 | N | D30 | d | D46 | t | |
| D13 | M | D29 | c1 | D45 | s | |
| D12 | L | D28 | b | D44 | r | |
| D11 | K | D27 | a | D43 | q | |
| D10 | J | D26 | Z | D42 | p | |
| D9 | I | D25 | Y | D41 | o | |
| D8 | H | D24 | X | D40 | n | |
| D7 | G | D23 | W | D39 | m | |
| D6 | F | D22 | V | D38 | l | |
| D5 | E | D21 | U | D37 | k | |
| D4 | D | D20 | T | D36 | j | |
| D3 | C | D19 | S | D35 | i | |
| D2 | B | D18 | R | D34 | h | |
| D1 | A | D17 | Q | D33 | g | |

| Address Generation Rule # | Page Miss Position | Address Difference (Depth Value) |
|---|---|---|
| 1 | 4 | −7(=D16⇒D9) |
| 2 | 16 | +25(=D4⇒D29) |
| 3 | − | − |

| Address Generation Rule # | Page Miss Position | Address Difference (Depth Value) |
|---|---|---|
| 1 | 1 | −1(=D4⇒D3) |
| 2 | 4 | +7(=D1⇒D8) |
| 3 | − | − |

| Address Generation Rule # | Page Miss Position | Address Difference (Depth Value) |
|---|---|---|
| 1 | 1 | −4(=D13⇒D9) |
| 2 | 4 | +13(=D1⇒D14) |
| 3 | 16 | +25(=D4⇒D29) |

FIG. 11

| Address Generation Rule # | Page Miss Position | Address Difference (Depth Value) |
|---|---|---|
| 1 | 1 | −1(=D16⇒D15) |
| 2 | 16 | +31(=D1⇒D32) |

| Address Generation Rule # | Page Miss Position | Address Difference (Depth Value) |
|---|---|---|
| 1 | 1 | −4(=D16⇒D12) |
| 2 | 4 | +11(=D4⇒D15) |
| 3 | 16 | +31(=D1⇒D32) |

| Address Generation Rule # | Page Miss Position | Address Difference (Depth Value) |
|---|---|---|
| 1 | 1 | +4(=D1⇒D5) |
| 2 | 4 | −11(=D13⇒D2) |
| 3 | 16 | +1(=D16⇒D17) |

| Address Generation Rule # | Page Miss Position | Address Difference (Depth Value) |
|---|---|---|
| 1 | 1 | +4(=D4⇒D8) |
| 2 | 4 | −13(=D16⇒D3) |
| 3 | 12 | +7(=D13⇒D20) |

FIG. 18

| Rotation Direction | Control Value |
|---|---|
| X-axis | 2 |
| Y-axis | 2 |
| 90° | 3 |
| 180° | 2 |
| 90° + X-axis | 3 |
| 90° + Y-axis | 3 |
| 270° | 3 |

113-1

METHOD FOR ROTATING AN ORIGINAL IMAGE USING SELF-LEARNING AND APPARATUSES PERFORMING THE METHOD

CROSS-REFERENCE TO RELATED APPLICATIONS

This application claims priority under 35 U.S.C. §119(a) from Korean Patent Application No. 10-2013-0022159 filed on Feb. 28, 2013, the disclosure of which is hereby incorporated by reference in its entirety.

BACKGROUND

At least one example embodiment of inventive concepts relates to an image rotation technology, and more particularly to a method of rotating an original image based on address generation rules generated through self-learning, and/or devices performing the method.

As high performance mobile devices have been developed, display devices of the high performance mobile devices have been increased in resolution and size.

When a user rotates the display device in a specific direction, an image displayed on the display device may switch orientations. For example, the displayed image may switch from a landscape shape or landscape orientation to a portrait shape or portrait orientation.

A rotator performs the function of rotating an image to be displayed on the display device and generating a rotated image.

SUMMARY

According to at least one example embodiment, a method of rotating an original image includes performing a self-learning using addresses related to at least one page miss, and generating address generation rules using a result of the self-learning. The method further includes pre-fetching the original image from a memory device based on the address generation rules to obtain a pre-fetched image, and generating a rotated image using the pre-fetched image.

According to at least one example embodiment, the generating address generation rules generates the address generation rules based on a control value set in a special function register (SFR).

According to at least one example embodiment, the pre-fetching the original image includes pre-fetching the original image from the memory device to an image buffer based on the address generation rules to obtain the pre-fetched image.

According to at least one example embodiment, the method further includes programming, by a manufacturer or a user, a number of the address generation rules to be generated.

According to at least one example embodiment, the method further includes determining a number of address generation rules to be generated based on a direction in which the original image is to be rotated.

According to at least one example embodiment, the method further includes determining a number of address generation rules to be generated based on a number of page misses occurring in an initial frame of the rotated image.

According to at least one example embodiment, the self-learning is performed based on a position of the at least one page miss and a difference between the addresses related to the at least one page miss.

According to at least one example embodiment, the method further includes initializing the address generation rules whenever a direction in which the original image is rotated is changed.

According to at least one example embodiment, the addresses correspond to a position of the at least one page miss that is calculated using a counter.

According to at least one example embodiment, a system on chip (SoC) includes a memory management unit (MMU). The MMU is configured to perform a self-learning using addresses related to at least one page miss, generate address generation rules using a result of the self-learning, and pre-fetch an original image from a memory device to an image buffer based on the address generation rules. The SOS further includes a rotator configured to generate a rotated image using an image pre-fetched to the image buffer.

According to at least one example embodiment, the MMU is configured to determine a number of the address generation rules to be generated according to a direction in which the original image is to be rotated.

According to at least one example embodiment, the MMU is configured to determine a number of the address generation rules to be generated according to a number of page misses occurring in an initial frame of the rotated image.

According to at least one example embodiment, the MMU includes a special function register SFR, an address generation rule generation circuit, and a pre-fetch circuit. The special function register (SFR) is configured to store a control value. The address generation rule generation circuit is configured to generate the address generation rules based on the control value stored in the SFR. The pre-fetch circuit is configured to pre-fetch the original image to the image buffer according to the address generation rules.

According to at least one example embodiment, the SoC further includes a central processing unit (CPU) configured to control a number of the address generation rules to be generated by the MMU in response to control signals indicating a direction in which the original image is rotated.

According to at least one example embodiment, an application processor includes the above described SoC.

According to at least one example embodiment, the MMU of the application processor is configured to determine a number of the address generation rules to be generated according to a direction in which the original image is to be rotated.

According to at least one example embodiment, the MMU of the application processor of is configured to determine a number of the address generation rules to be generated according to a number of page misses occurring in an initial frame of the rotated image.

According to at least one example embodiment, the MMU of the application processor includes, a special function register (SFR) configured to store a control value, an address generation rule generation circuit configured to generate the address generation rules based on the control value stored in the SFR, and a pre-fetch circuit configured to pre-fetch the original image to the image buffer according to the address generation rules.

According to at least one example embodiment, the application processor further includes a central processing unit (CPU) configured to control a number of the address generation rules to be generated in the MMU in response to control signals indicating a direction in which the original image is rotated.

According to at least one example embodiment, a mobile device includes a memory device configured to store an original image and a memory management unit (MMU). The MMU is configured to perform a self-learning using addresses related to at least one page miss, generate address generation rules using a result of the self-learning, and pre-fetch an original image from a memory device to an image buffer according to the address generation rules. The mobile device further includes a rotator configured to generate a rotated image using an image pre-fetched to the image buffer, and a display controller configured to transmit the rotated image generated by the rotator to a display.

According to at least one example embodiment, the MMU is configured to determine a number of the address generation rules to be generated according to a direction in which the original image is rotated.

According to at least one example embodiment, the MMU is configured to determine a number of the address generation rules to be generated according to a number of page misses occurring in an initial frame of the rotated image.

According to at least one example embodiment, the mobile device further includes a central processing unit (CPU) configured to control a number of the address generation rules to be generated by the MMU in response to control signals indicating a direction in which the original image is to be rotated.

According to at least one example embodiment, the mobile device further includes a control signal generator configured to detect the direction in which the original image is to be rotated and generate the control signals according to a result of the detection.

According to at least one example embodiment, the mobile device further includes a rotation sensor configured to detect the direction in which the original image is to be rotated, and a control signal generator configured to generate the control signals in response to a sensing signal output from the rotation sensor.

According to at least one example embodiment, the MMU of the mobile device includes a special function register (SFR) configured to store a control value, an address generation rule generation circuit configured to generate the address generation rules based on the control value stored in the SFR, and a pre-fetch circuit configured to pre-fetch the original image to the image buffer according to the address generation rules.

According to at least one example embodiment, a mobile device includes a display configured to display a rotated image, and a computing device. The computing device is configured to detect a direction of rotation of the device, generate address generation rules based on the detected direction of rotation, generate the rotated image using an original image according to the address generation rules such that a page miss does not occur in the rotated image, and transmit the rotated image to the display.

According to at least one example embodiment, the computing device is configured generate the address generation rules based on a position of page misses associated with the detected direction of rotation, and a difference between addresses related to the page misses.

According to at least one example embodiment, the computing device is configured to generate the address generation rules such that a number of address generation rules is equal to a number of page misses associated with the detected direction of rotation.

According to at least one example embodiment, the computing device is configured to generate the rotated image by pre-fetching the original image from a memory device to an image buffer based on the address generation rules.

BRIEF DESCRIPTION OF THE DRAWINGS

These and/or other aspects and advantages of inventive concepts will become apparent and more readily appreciated from the following description of example embodiments, taken in conjunction with the accompanying drawings of which:

FIG. 2 schematically depicts a memory map of an external memory according to at least one example embodiment;

FIG. 5 is a conceptual diagram for describing address generation rules for generating an image rotated in the X-axis direction according to at least one example embodiment;

FIG. 7 is a conceptual diagram for describing address generation rules for generating an image rotated in the Y-axis direction according to at least one example embodiment;

Figure 8:
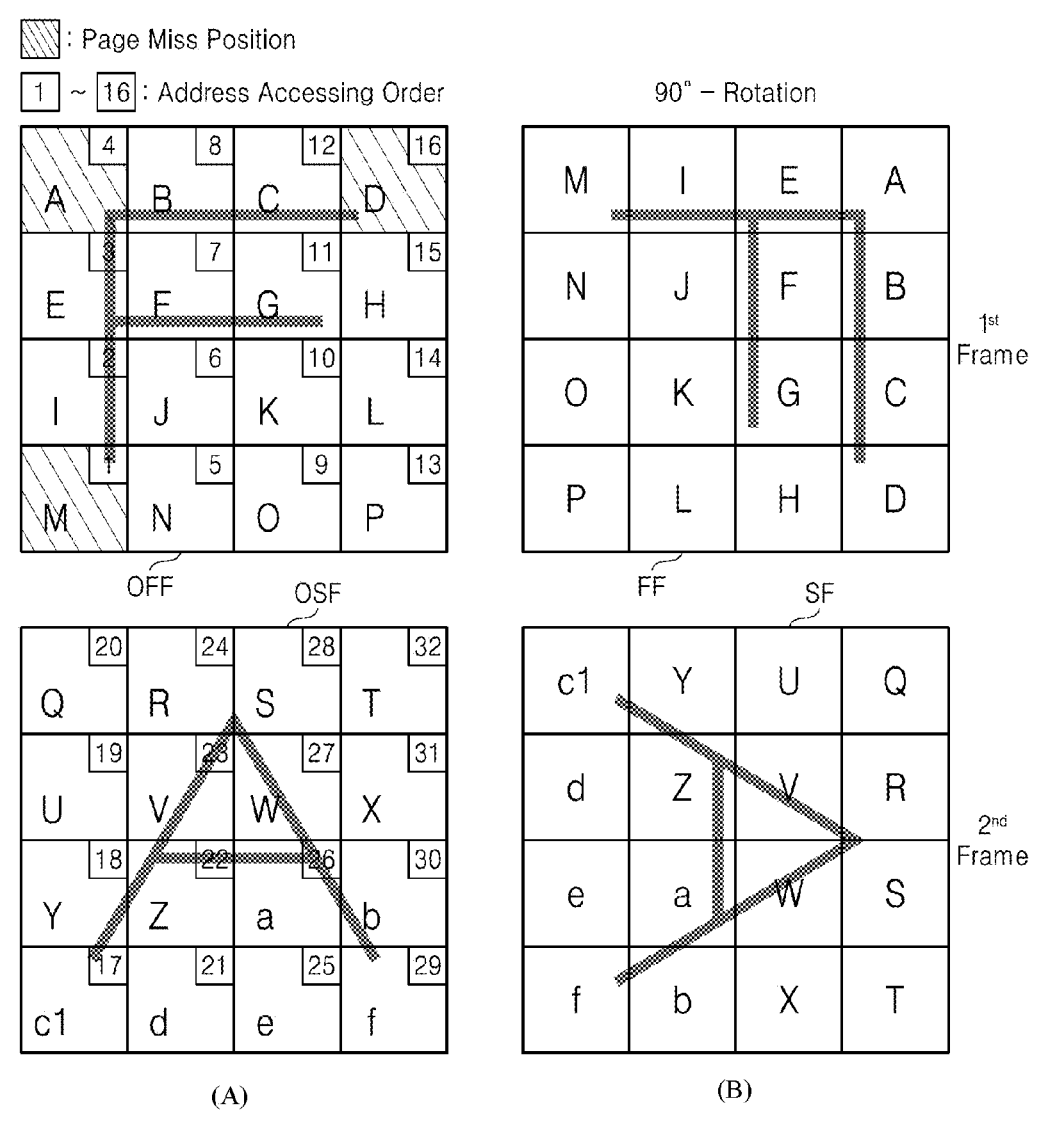

FIGS. 8A and 8B each depict an address access order for displaying a 90°-rotated image and a display image according to at least one example embodiment;

FIG. 9 is a conceptual diagram for describing address generation rules for generating the 90°-rotated image according to at least one example embodiment;

FIG. 11 is a conceptual diagram for describing address generation rules for generating the 180°-rotated image according to at least one example embodiment;

FIG. 13 is a conceptual diagram for describing address generation rules for generating the image which is rotated by 90° and then rotated in the X-axis direction according to at least one example embodiment;

FIG. 15 is a conceptual diagram for describing address generation rules for generating the image which is rotated by 90° and then rotated in the Y-axis direction according to at least one example embodiment;

Figure 16:
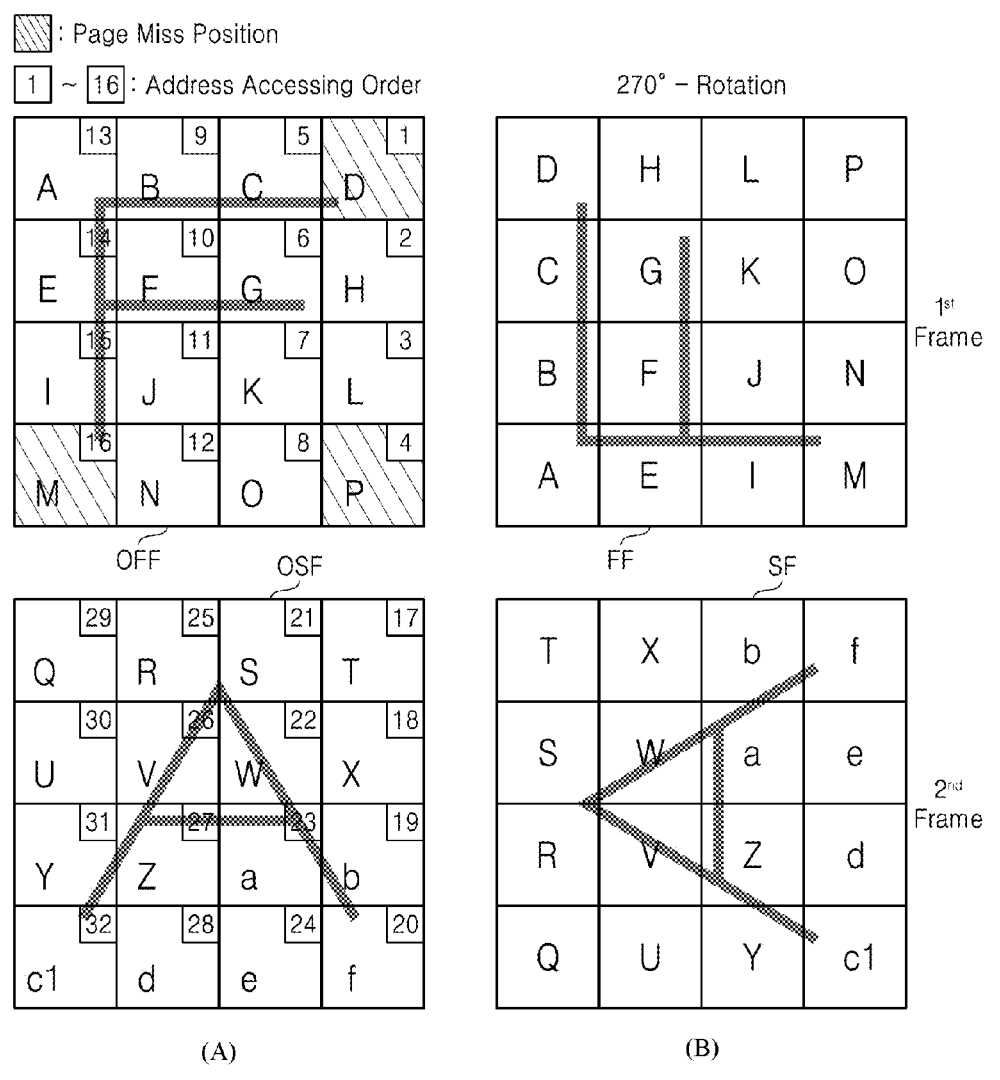

FIGS. 16A and 16B each depict an address access order for displaying an image which is rotated by 270° and a display image according to at least one example embodiment;

FIG. 17 is a conceptual diagram for describing address generation rules for generating the image which is rotated by 270° according to at least one example embodiment;

FIG. 18 is an example embodiment of a control value table including the number of address generation rules determined according to a rotation direction;

DETAILED DESCRIPTION OF THE EMBODIMENTS

Figure 1:
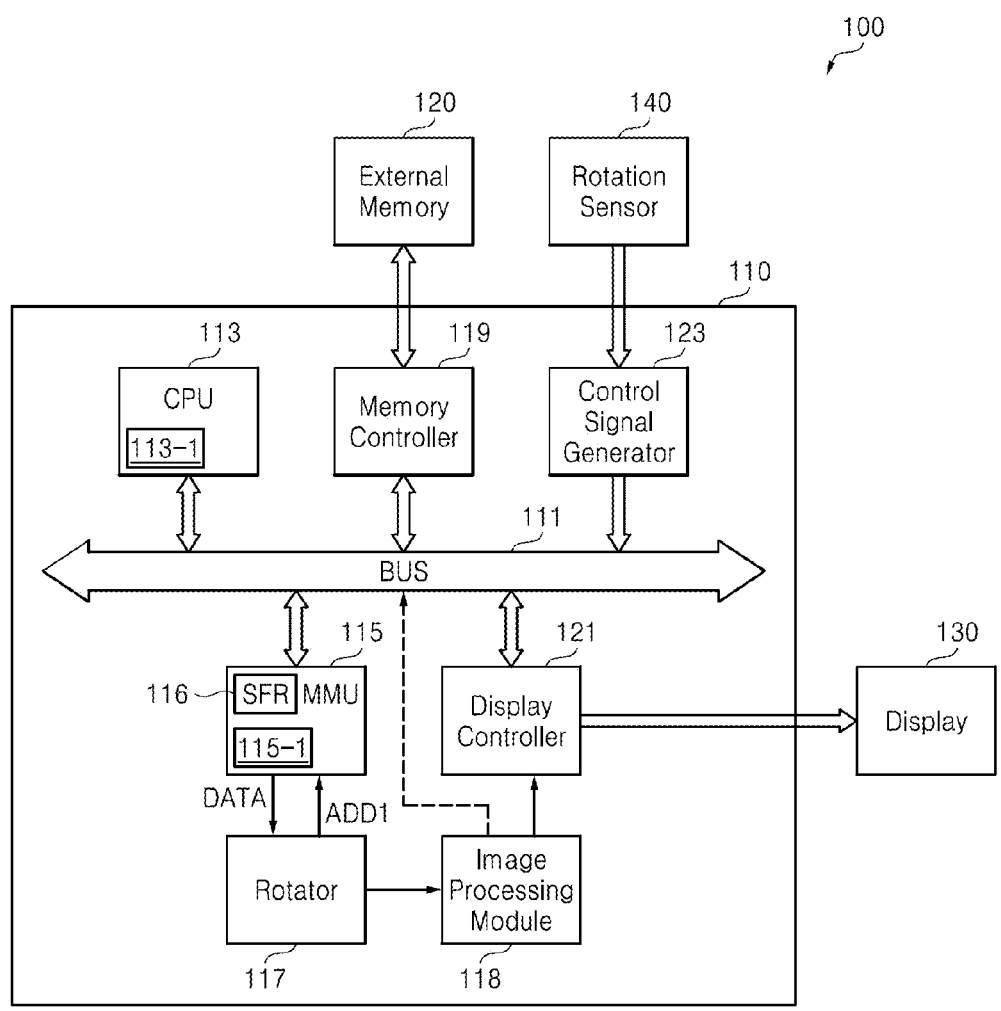
FIG. 1 is a schematic block diagram of a computing system according to at least one example embodiment of inventive concepts.
Figure 3:
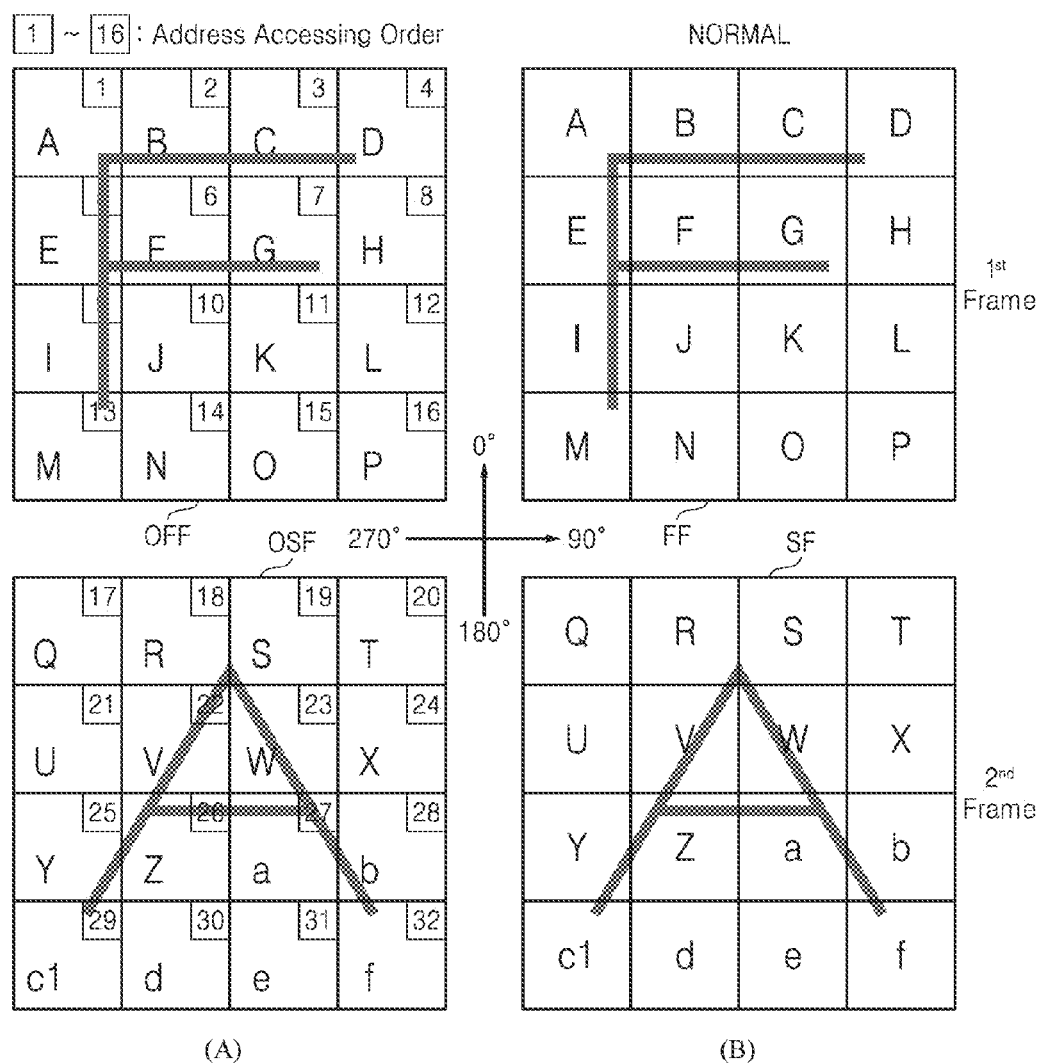
FIGS. 3A and 3B each depict an address access order for displaying an original image and a display image according to at least one example embodiment.
Figure 4:
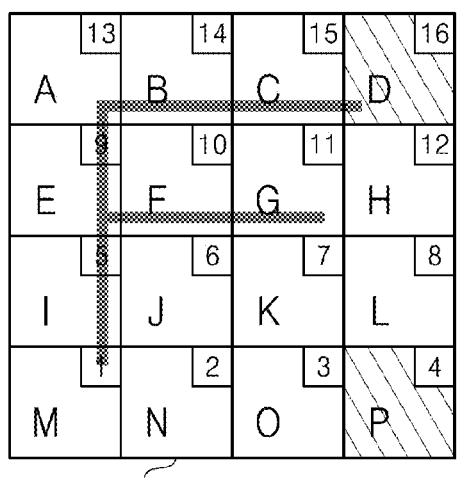
FIGS. 4A and 4B each depict an address access order for displaying an image rotated in a X-axis direction and a display image according to at least one example embodiment.
Figure 4:
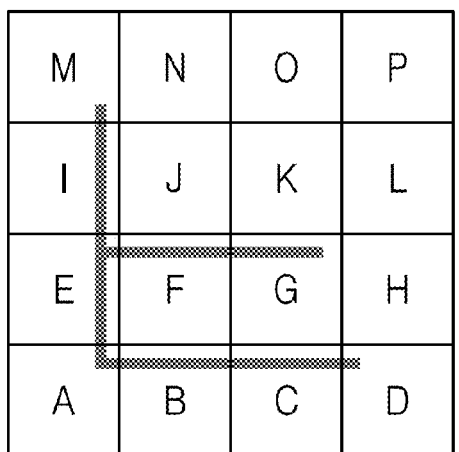
Figure 4:
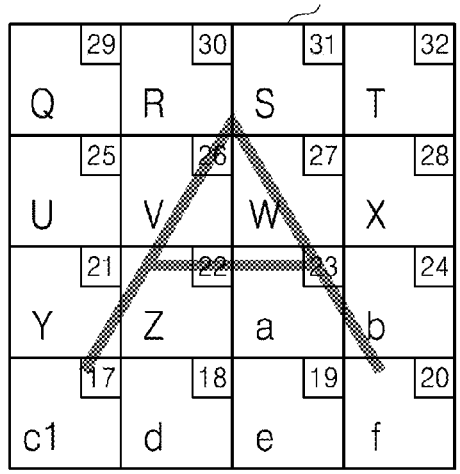
Figure 4:
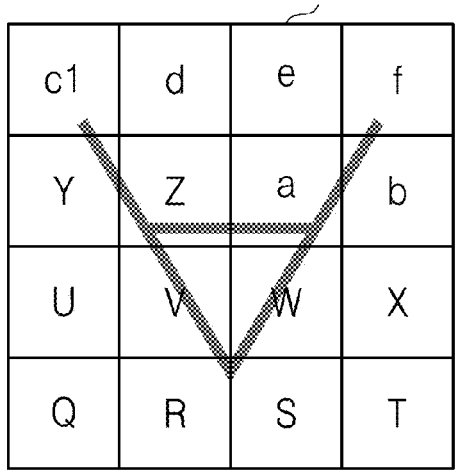
Figure 6:
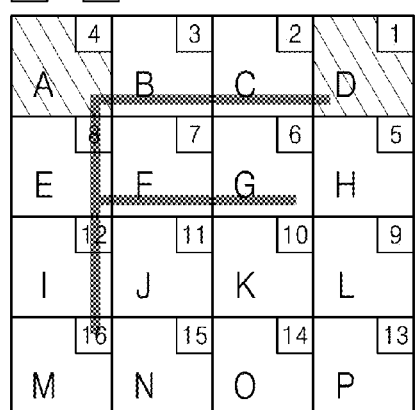
FIGS. 6A and 6B each depict an address access order for displaying an image rotated in a Y-axis direction and a display image according to at least one example embodiment.
Figure 6:
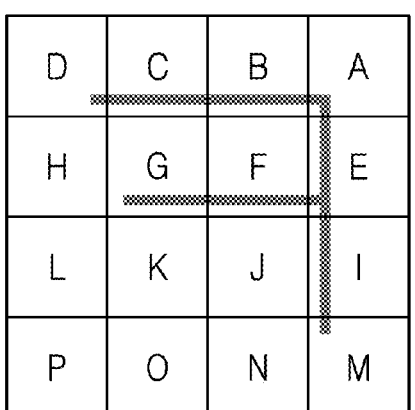
Figure 6:
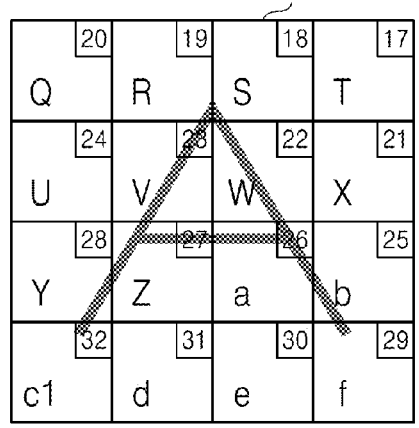
Figure 6:
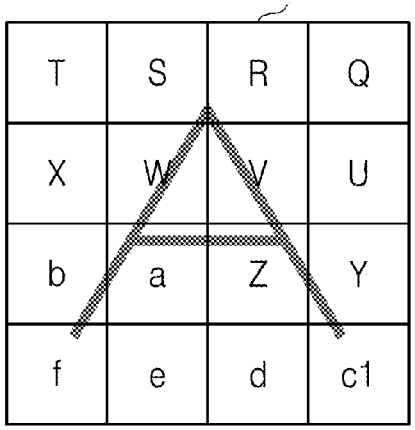
Figure 10:
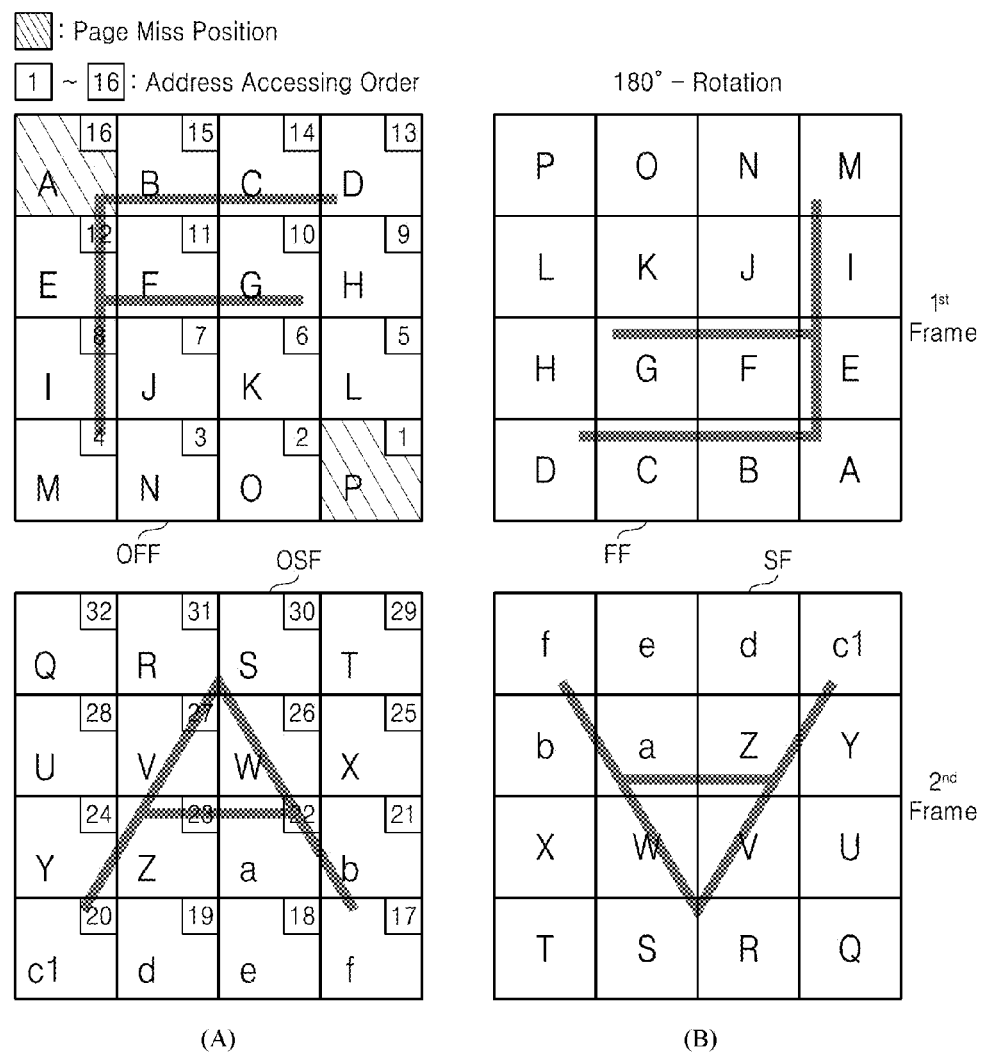
FIGS. 10A and 10B each depict an address access order for displaying a 180°-rotated image and a display image according to at least one example embodiment.
Figure 12:
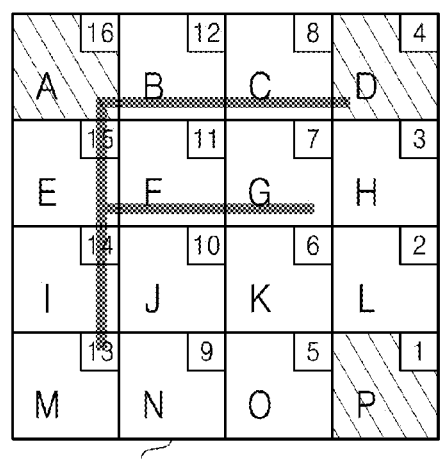
FIGS. 12A and 12B each depict an address access order for displaying an image which is rotated by 90° and then rotated in the X-axis direction and a display image according to at least one example embodiment.
Figure 12:
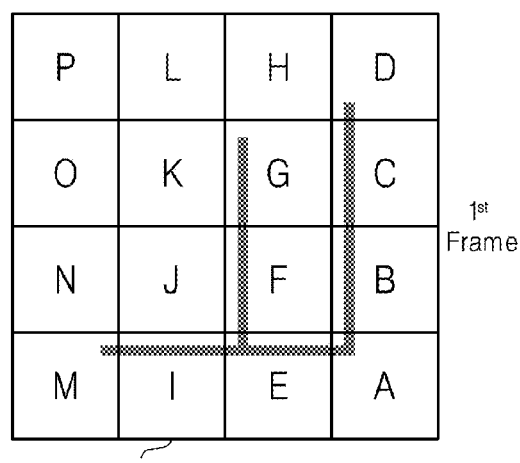
Figure 12:
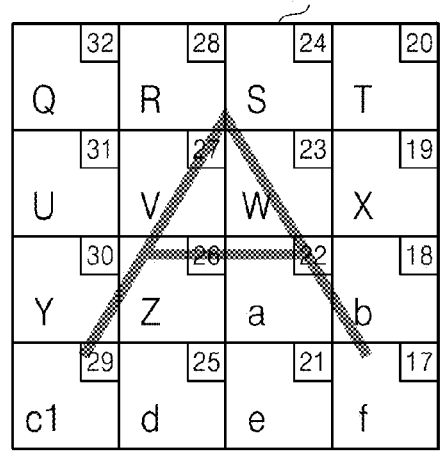
Figure 12:
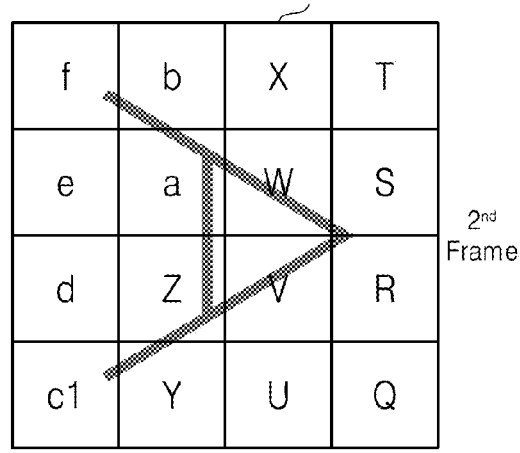
Figure 14:
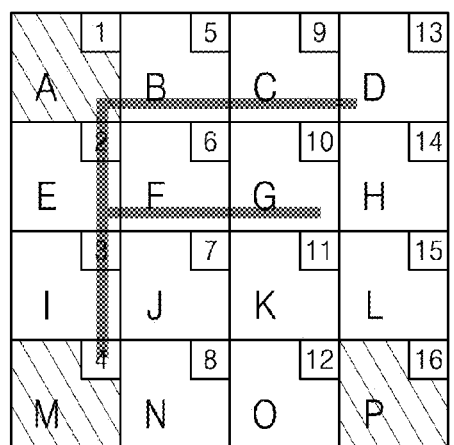
FIGS. 14A and 14B each depict an address access order for displaying an image which is rotated by 90° and then rotated in the Y-axis direction and a display image according to at least one example embodiment.
Figure 14:
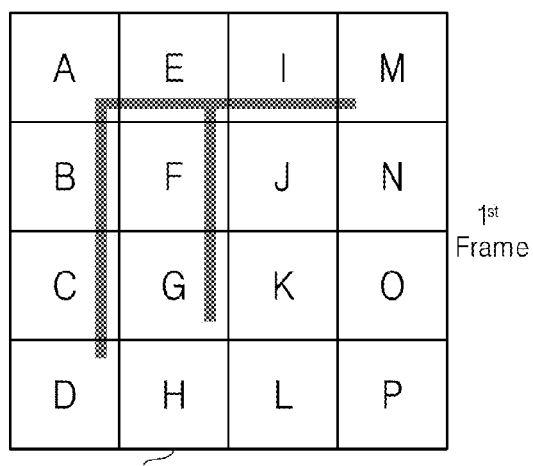
Figure 14:
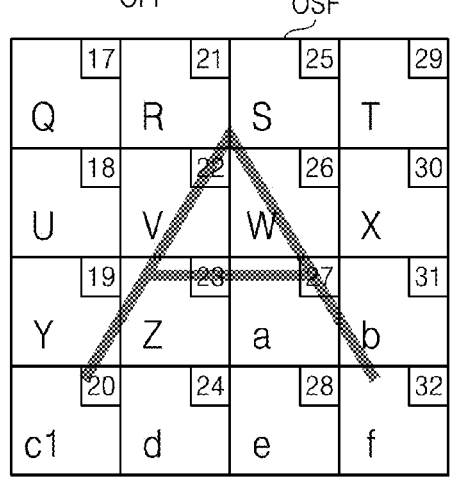
Figure 14:
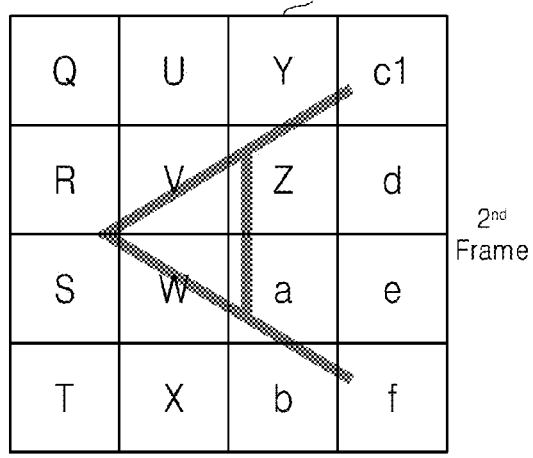

Inventive concepts now will be described more fully hereinafter with reference to the accompanying drawings, in which example embodiments are shown. Inventive concepts may, however, be embodied in many different forms and should not be construed as limited to the example embodiments set forth herein. Rather, these example embodiments are provided so that this disclosure will be thorough and complete, and will fully convey the scope of inventive concepts to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or inventive concepts, and will not be interpreted in an idealized or overly formal sense unless expressly so defined herein.

FIG. 1 is a schematic block diagram of a computing system according to at least one example embodiment of inventive concepts. Referring to FIG. 1, a computing system 100 may include a computing device 110, an external memory 120, a display 130, and a rotation sensor 140.

The computing system 100 may be embodied in a personal computer (PC), a portable electronic device (or a mobile device), an electronic device including a display 130 displaying a rotatable image, etc.

The portable electronic device may be embodied in a laptop computer, a mobile phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), an e-book, etc.

The computing device 110 may process (e.g., rotate) an original image output from an external memory 120 or an internal memory (not shown) embodied therein, and transmit the processed image to the display 130.

The computing device 110 may perform a self-learning using addresses (e.g., a difference between addresses) related to at least one page miss, generate address generation rules using a result of the self-learning, pre-fetch an original image from a memory device, e.g., the external memory 120 or an internal memory, according to the address generation rules, generate a rotated image using the pre-fetched image, and transmit the rotated image to the display 130.

The computing device 110 may be embodied in a printed circuit board (PCB) such as a motherboard, an integrated circuit (IC), a system on chip (SoC), or the like.

The computing device 110 includes a central processing unit (CPU) 113, a memory management unit (MMU) 115, a rotator 117, an image processing module 118, a memory controller 119, a display controller 121, and a control signal generator 123.

The CPU 113 may control an operation of the computing device 110. For example, the CPU 113 may control an operation of at least one of a plurality of components 115, 117, 119, 121, and 123 through a bus 111.

The CPU 113 may control or set the number of address generation rules to be generated in the MMU 115 in response to control signals indicating a direction in which an original image stored in the external memory 120 or an internal memory is to be rotated.

As illustrated in FIG. 18, a control value table 113-1 including each of control values for each of rotation directions may be stored in a memory (not shown) included in the CPU 113, or loaded from other memory to the CPU 113 when the computing system is booted. The other memory may be the external memory 120 or an additional memory.

For example, in response to the control signals, the CPU 113 may set or program control values controlling the number of address generation rules to be generated in the MMU 115 in a special function register (SFR) 116. Here, the CPU 113 may refer to the control value table 113-1 based on the control signals.

The MMU 115 may perform a self-learning using a difference between addresses related to at least one page miss, generate address generation rules using a result of the self-learning, and pre-fetch data included in an original image from the external memory 120 to an image buffer 115-1 of the MMU 115 based on the address generation rules.

When data stored in the external memory 120 is pre-fetched by pages by the MMU 115, the image buffer 115-1 may perform a function of a page buffer.

For convenience of description, an embodiment is illustrated where data stored in the external memory 120 is pre-fetched by the MMU 115; however, data to be pre-fetched by the MMU 115 may be embodied inside the computing device 110.

The rotator 117 may generate a rotated image using an image pre-fetched to the MMU 115, e.g., the image buffer 115-1.

According to at least one example embodiment, an image processing module 118 may process a rotated image output from the rotator 117, and transmit the processed image to the display controller 121 through a bus 111 (dashed arrow).

According to at least one other example embodiment, the image processing module 118 may process the rotated image output from the rotator 117 and transmit the processed image to the display controller 121 (solid arrow).

The memory controller 119 may transmit data of an original image stored in the external memory 120 to the MMU 115 by a constant size, e.g., a page, according to a control of the MMU 115, e.g., in response to a pre-fetch operation of the MMU 115. In addition, the memory controller 119 may transmit an image stored in the external memory 120 to the display controller 121 according to a control of the CPU 113.

The display controller 121 may transmit the rotated image processed by the image processing module 118 to the display 130.

The control signal generator 123 may generate a plurality of control signals in response to a sensing signal output from the rotation sensor 123. The plurality of control signals may be interpreted by the CPU 113, and be used as a plurality of indication signals indicating a direction in which an original image is rotated according to a result of the interpretation.

The external memory 120 may store an original image, e.g., a still image or a moving image. The external memory 120 may be embodied in a hard disk drive (HDD), a solid state drive (SSD), or the like.

The external memory 120 may be a volatile memory device or a non-volatile memory device. The volatile memory device may be embodied in a dynamic random access memory (DRAM), a static random access memory (SRAM), a thyristor RAM (T-RAM), a zero capacitor RAM (Z-RAM), a Twin Transistor RAM (TTRAM), etc.

The non-volatile memory device may be an electrically erasable programmable read-only memory (EEPROM), a flash memory, a Magnetic RAM (MRAM), a Spin-Transfer Torque (STT)-MRAM, a Conductive bridging RAM (CBRAM), a Ferroelectric RAM (FeRAM), a Phase change RAM (PRAM), a Resistive RAM (RRAM), a Nanotube RRAM, a Polymer RAM (PoRAM), a Nano Floating Gate Memory (NFGM), a holographic memory, a Molecular Electronics Memory Device, an Insulator Resistance Change Memory, etc.

The non-volatile memory device may be a flash-based memory device, e.g., a secure digital (SD) card, a multimedia card (MMC), an embedded-MMC (eMMC), a universal serial bus (USB) flash driver, a universal flash storage (UFS), etc.

According to a control of the display controller 121, the display 130 may display an original image which is not rotatable or a rotated image.

The display 130 may be a flat panel display. The flat panel display may be a thin film transistor-liquid crystal display (TFT-LCD), a light emitting diode (LED) display, an organic LED (OLED) display, an active-matrix OLED (AMOLED) display, a flexible display, etc.

The rotation sensor 140 is a sensor which may perform a function of detecting rotation or a rotation direction of the computing system 100 and generating a sensing signal. For example, the rotation sensor 140 may bean accelerometer sensor, a gyro sensor, or a combined sensor thereof.

FIG. 2 schematically illustrates a memory map of the external memory according to at least one example embodiment. The memory map 121 shown in FIG. 2 is exemplarily illustrated for convenience of description. The memory map 121 denotes each data "A" to "Z", and "a" to "v" stored in each memory region corresponding to each address D1 to D48. For example, each data "A" to "Z" and "a" to "v" may denote page data.

A first frame of an original image includes data "A" to "P", a second frame of the original image includes "Q" to "f", and a third frame of the original image includes data "g" to "v".

Referring to FIGS. 2, 3A, 3B, 4A, 4B, 6A, 6B, 8A, 8B, 10A, 10B, 12A, 12B, 14A, 14B, 16A, and 16B, a number "1" to "32" in each small box indicates an address access order or a data pre-fetch order according to a rotation direction, and English alphabet letters "A" to "Z" and "a" to "f" in each larger box denote data included in the original image.

In addition, a first frame OFF of the original image includes data "A" to "P", and a second frame OSF of the original image includes data "Q" to "Z" and "a" to "f". Here, the MMU 115 per-fetches each data included in each frame OFF and OSF from the external memory 120 to the image buffer 115-1 according to the address access order "1" to "32".

FIGS. 3A and 3B each illustrate an address access order for displaying an original image and a display image according to at least one example embodiment. FIG. 3A illustrates each frame OFF and OSF including data to be accessed by the MMU 115 according to the address access order "1" to "32". FIG. 3B is an image displayed on the display device 130.

In order to display a first frame FF, the MMU 115 pre-fetches each data "A" to "P" from the external memory 120 based on addresses ADD1=D1 to ADD1=D16 sequentially output from the rotator 117 according to the address access order "1" to "16", and transmits each pre-fetched data DATA="A" to DATA="P" to the rotator 117.

For example, the MMU 115 pre-fetches each current data "A" to "P", corresponding to each current address D1 to D16 sequentially output from the rotator 117, from the external memory 120 to the image buffer 115-1 through the memory controller 119.

While each current data "A" to "P" is sequentially transmit to the rotator 117, the MMU 115 estimates each next address D2 to D17 and pre-fetches each next data "B" to "Q" from the external memory 120 to the image buffer 115-1 according to a result of expectation, so that a page miss does not occur in the MMU 115 even though each next address D2 to D17 is input.

Accordingly, the first frame OFF of the original image is normally displayed on the display 130. That is, the address access order "1" to "16" is the same as an order of the address ADD1=D1 to ADD1=D16 sequentially output from the rotator 117, so that the page miss does not occur in the MMU 115.

The rotator 117 may transmit each data DATA="A" to DATA="P" output from the MMU 115 to the image processing module 118, and the image processing module 118 may process each data DATA="A" to DATA="P", and transmit each processed data to the display controller 121 directly or through a bus 111.

Accordingly, as illustrated in FIG. 3B, the display controller 121 in a normal state NORMAL may display the first frame FF, including each data "A" to "P" transmitted from the rotator 117, through the display 130.

In order to display a second frame SF, the MMU 115 pre-fetches each data "Q" to "f" from the external memory 120 based on addresses ADD1=D17 to ADD1=D32 sequentially output from the rotator 117 according to an address access order "17" to "32", and transmits each pre-fetched data DATA="Q" to DATA="f" to the rotator 117. Here, the address access order "17" to "32" is the same as an order of an address ADD1=D17 to ADD1=D32 sequentially output from the rotator 117, so that a page miss does not occur in the MMU 115.

The rotator 117 may transmit each data DATA="Q" to DATA="f" output from the MMU 115 to the image processing module 118, process the each data DATA="Q" to DATA="f", and transmit the each processed data to the display controller 121 directly or through the bus 111.

Accordingly, as illustrated in FIG. 3B, the display controller 121 in a normal state NORMAL may display a second frame SF including each data "Q" to "f" transmitted from the rotator 117 through the display 130. That is, a first frame OFF of an original image in a normal state NORMAL is displayed as it is, and a second frame OSF of the original image is displayed as it is.

FIGS. 4A and 4B each illustrate an address access order for displaying an image rotated in an X-axis direction and a display image according to at least one example embodiment. FIG. 5 is a conceptual diagram for describing address generation rules for generating an image rotated in the X-axis direction according to at least one example embodiment.

Referring to FIGS. 1, 2, 3A, 3B, 4A, 4B, and 5, when a user rotates the computing system 100 in the X axis direction, the rotation sensor 140 senses the rotation and outputs the generated sensing signal to the control signal generator 123 according to a result of the sensing. The control signal generator 123 outputs control signals to the CPU 113 in response to the sensing signal.

The CPU 113 reads a control value, e.g., 2, stored in the control value table 113-1 shown in FIG. 18, and sets or programs the read control value in the SFR 116 included in the MMU 115.

The control value is the number of page misses occurring when the computing system 100 pre-fetches data included in the first frame OFF of the original image after being rotated in the X-axis direction, i.e., the number of address generation rules to be generated in the MMU 115.

Accordingly, the MMU 115 may perform a self-learning using differences between addresses related to two page misses, generate two address generation rules using a result of the self-learning, and pre-fetch each data from the external memory 120 based on the two address generation rules.

That is, the self-learning denotes a process of generating address generation rules using page miss positions and differences between addresses related to the page misses.

A box including a diagonal line of FIG. 4A indicates a page miss position. Accordingly, a page miss occurs in each address access order "4" and "16".

A first frame OFF of the original image includes data "A" to "P", a second frame OSF of the original image includes data "Q" to "f", and each data "A" to "P" and "Q" to "f" is accessed or pre-fetched by the MMU 115 according to an address access order "1" to "32".

First of all, the rotator 117 transmits an address ADD1=D13 for data "M" to the MMU 115. The MMU 115 transmits the address ADD1=D13 to the memory controller 119, and the memory controller 119 reads the data "M" corresponding to the address ADD1=D13 from a memory region of the external memory 120 and transmits the read data "M" to the MMU 115.

While the MMU 115 transmits data DATA=M to the rotator 117, the MMU 115 estimates a next sequential address D14 after a current address D13, and pre-fetches data "N" corresponding to the estimated address D14 from a memory region of the external memory 120 to the image buffer 115-1 using the memory controller 119.

Before an address generation rule is applied to the MMU 115, the MMU 115 estimates an address in a sequential manner.

The rotator 117 transmits the address ADD1=D14 for data "N" to the MMU 115. The data "N" is pre-fetched to the image buffer 115-1 of the MMU 115, so that the MMU 115 transmits the data DATA="N" to the rotator 117.

While the data DATA="N" is transmitted to the rotator 117, the MMU 115 estimates a next sequential address D15 after a current address D14, and pre-fetches data "O" stored in a memory region of the external memory 120 corresponding to the estimated address D15 to the image buffer 115-1 using the memory controller 119.

The rotator 117 transmits an address ADD1=D15 for data "O" to the MMU 115. The data "O" is pre-fetched to the image buffer 115-1 of the MMU 115, so that the MMU 115 transmits the data DATA=O to the rotator 117.

While the data DATA="O" is transmitted to the rotator 117, the MMU 115 estimates a next sequential address D16 after the current address D15, and pre-fetches data "P" stored in a memory region of the external memory 120 corresponding to the estimated address D16 to the image buffer 115-1 using the memory controller 119.

The rotator 117 transmits the address ADD1=D16 for data "P" to the MMU 115. The data "P" is pre-fetched to the image buffer 115-1 of the MMU 115, so that the MMU 115 transmits the data DATA="P" to the rotator 117.

While the data DATA="P" is transmitted to the rotator 117, the MMU 115 estimates a next sequential address D17 after a current address D16, and pre-fetches data "Q" stored in a memory region of the external memory 120 corresponding to the estimated address D17 to the image buffer 115-1 using the memory controller 119.

However, the rotator 117 transmits an address ADD1=D9 for data "I" to the MMU 115. Here, the data "I" is not present in the image buffer 115-1 of the MMU 115, and a first page miss occurs.

The MMU 115 pre-fetches data "I" corresponding to the address ADD1=D9 from the external memory 120 to the image buffer 115-1 using the memory controller 119.

Figure 19:
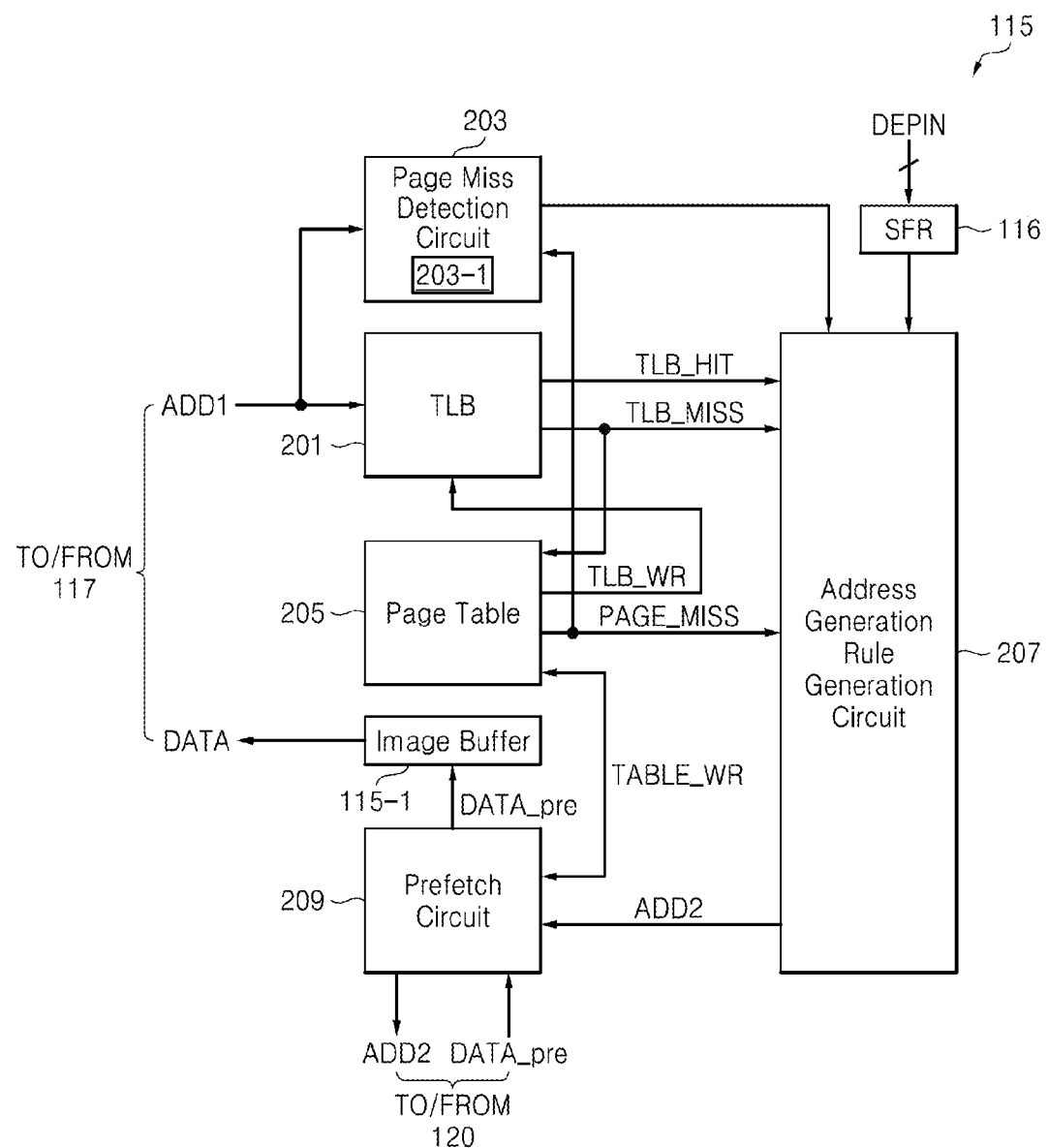
FIG. 19 is a block diagram of the memory management unit illustrated in FIG. 1.

Here, the MMU 115 stores a difference between the address D16 for the data "P" and the address D9 for the data "I", i.e., a first depth value, e.g., "−7", in an internal memory, e.g., 203-1 of FIG. 19. In addition, the MMU 115 stores a position where a first page miss occurs (hereinafter, "a first page miss position"), e.g., "4", in the internal memory.

That is, the MMU 115 performs a first self-learning using the first depth value and the first page miss position, and generates a first address generation rule using a result of the first self-learning.

The MMU 115 may estimate at which position in each frame OFF and OSF of the original image a page miss occurs using the first page miss position. Accordingly, the MMU 115 may estimate each address using the first address generation rule in each position where a page miss occurs (e.g., 12, 8, and 4), and pre-fetch each data corresponding to each estimated address.

While the data DATA="I" is transmitted to the rotator 117, the MMU 115 estimates a next sequential address D10 after the current address D9, and pre-fetches data "J" corresponding to the estimated address D10 from the external memory 120 to the image buffer 115-1 using the memory controller 119.

A process of processing each data "J", "K", and "L" is substantially the same as a process of processing each data "N", "O", and "P". Accordingly, each data "J", "K", and "L" corresponding to each address ADD1=D10, D11, and D12, respectively, is pre-fetched by the MMU 115, and each pre-fetched data "J", "K", and "L" is transmitted to the rotator 117.

While data DATA="L" is transmitted to the rotator 117, the MMU 115 pre-fetches data "E" corresponding to an address D5 estimated according to a first address generation rule to the image buffer 115-1 instead of data "M" corresponding to a next sequential address D13 after the current address D12. Accordingly, even if the address ADD1=D5 is input from the rotator 117, a page miss does not occur in the MMU 115.

A process of processing each data "F", "G", and "H" is substantially the same as a process of processing each data "J", "K", and "L". Accordingly, each data "F", "G", and "H" corresponding to each address ADD1=D6, D7, and D8, respectively, is pre-fetched by the MMU 115, and each pre-fetched data "F", "G", and "H" is transmitted to the rotator 117.

While the data DATA="H" is transmitted to the rotator 117, the MMU 115 pre-fetches data "A" corresponding to an address D1 estimated according to a first address generation rule, instead of pre-fetching data "I" corresponding to a next sequential address D9 after a current address D8, to the image buffer 115-1. Accordingly, even if the address ADD1=D1 is input from the rotator 117, a page miss does not occur in the MMU 115.

A process of processing each data "B", "C", and "D" is substantially the same as the process of processing each data "F", "G", and "H". Accordingly, each data "B", "C", and "D" corresponding to each address ADD1=D2, D3, and D4 is pre-fetched by the MMU 115, and each pre-fetched data "B", "C", and "D" is transmitted to the rotator 117.

However, while last data DATA="D" of the first frame OFF of the original image is transmitted to the rotator 117, the MMU 115 pre-fetches data, stored in a memory region corresponding to an address of a previous frame of the original image which is estimated according to the first address generation rule, to the image buffer 115-1.

According to a seventeenth address access order 17, the rotator 117 transmits an address ADD1=D29 for data "c1" included in the second frame OSF of the original image to the MMU 115. Here, since the data "c1" required by the rotator 117 is not present in the image buffer 115-1 of the MMU 115, a second page miss occurs.

The MMU 115 pre-fetches the data "c1" stored in a memory region of the external memory 120 corresponding to an address ADD1=D29 to the image buffer 15-1 using the memory controller 119.

The MMU 115 stores a difference between an address D4 of the data "D" and an address D29 of the data "c1", i.e., a second depth value, e.g., "+25", in an internal memory, e.g., 203-1 of FIG. 19. In addition, the MMU 115 stores a position where a second page miss occurs (hereinafter, referred to as "a second page miss position"), e.g., "16", in the internal memory.

That is, the MMU 115 performs a second self-learning by using addresses D4 and D29 related to a second page miss and a second page miss position, e.g., "16", and generates a second address generation rule using a result of the second self-learning.

The MMU 115 may estimate at which position a page miss occurs by using the first page miss position, e.g., 4, and a second page miss position, e.g., 16. Accordingly, the MMU 115 may estimate each address by using a first address generation rule and a second address generation rule at each position 20, 24, 28, and 32 where a page miss occurs, and pre-fetch each data by using each estimated address.

In a first frame of the original image, i.e., an initial frame OFF of a rotated image, two page misses occur.

Accordingly, as illustrated in FIG. 4A, when pre-fetching data stored in a second frame OSF of the original image, a page miss does not occur in the MMU 115. As illustrated in FIG. 4B, in the first frame FF, the rotator 117 transmits each data output from the MMU 117 to the display 130 through the image processing module 118 and the display controller 121. Accordingly, an image processed according to an address access order 1 to 16, i.e., an X-axis rotated image FF, is displayed on the display 130.

While data DATA="c1" pre-fetched to the image buffer 115-1 is transmitted to the rotator 117, the MMU 115 pre-fetches data "d" corresponding to a next sequential address D30 estimated according to a first address generation rule to the image buffer 115-1.

While each data "f", "b", and "X" is transmitted to the rotator 117, the MMU 115 pre-fetches each data "Y", "U", and "Q" to the image buffer 115-1 according to a first address generation rule. Accordingly, even if each address ADD1=D25, D21, and D17 is input to the rotator 117, a page miss does not occur in the MMU 115.

Referring to FIG. 2, while data DATA="T" is transmitted to the rotator 117, the MMU 115 pre-fetches data "s" corresponding to an address D45 estimated based on a second address generation rule to the image buffer 115-1. Accordingly, even if the address D45 is input to the rotator 117, a page miss does not occur in the MMU 115.

As illustrated in FIG. 4B, in the second frame SF, the rotator 117 transmits each data output from the MMU 115 to the display 130 through the image processing module 118 and the display controller 121. Accordingly, an image processed according to the address access order "17" to "32", i.e., X-axis rotated image SF, is displayed on the display 130.

As described above, the MMU 115 may perform a self-learning using a page miss position and a difference between addresses related to the page miss whenever a page miss occurs according to a control value stored in the SFR 116, generate address generation rules using a result of the self-learning, and pre-fetch data included in an original image to the image buffer 115-1 using the address generation rules.

After the computing system 100 is rotated, page misses may occur at a process of pre-fetching data included in the first frame OFF of the original image. However, according to at least one example embodiment, data is pre-fetched according to address generation rules generated through a self-learning after the second frame OSF of the original image so that a page miss does not occur.

The MMU 115 may reduce the number of page misses occurring according to an image rotation, thereby reducing data pre-fetch time and improving a performance of the computing device 10.

Whenever the computing system 100 is rotated, the SFR 116 is set by a new control value, and page miss positions and address generation rules are initialized.

FIGS. 6A and 6B each illustrate an address access order for displaying an image rotated in a Y-axis direction and a display image according to at least one example embodiment. FIG. 7 is a conceptual diagram for describing address generation rules for generating an image rotated in the Y-axis direction according to at least one example embodiment.

Referring to FIGS. 1, 2, 3A, 3B, 6A, 6B, and 7, when a user rotates the computing system 100 in a Y-axis direction, the rotation sensor 140 senses the rotation, and outputs a sensing signal generated based on a result of the sensing to the control signal generator 123. The control signal generator 123 outputs control signals to the CPU 113 in response to the sensing signal.

The CPU 113 reads a control value, e.g., 2, stored in a control value table 113-1 shown in FIG. 18, and sets or programs the read control value in the SFR 116 included in the MMU 115 in response to the control signals.

The control value indicates the number of page misses occurring when pre-fetching data included in the first frame OFF of the original image after the computing system 100 is rotated in the Y-axis direction, i.e., the number of address generation rules to be generated in the MMU 115.

As described above, the MMU 115 performs a self-learning using two page miss positions and differences between addresses related to each of the two page misses, generates two address generation rules using a result of the self-learning, and pre-fetches each data included in each frame OFF and OSF of the original image from the external memory 120 based on the two address generation rules.

The rotator 117 transmits an address ADD1=D4 for data "D" to the MMU 115. The MMU 115 pre-fetches the data "D" corresponding to the address ADD1=D4 from the external memory 120 to the image buffer 115-1 using the memory controller 119.

While data DATA="D" is transmitted to the rotator 117, the MMU 115 estimates a next address D5, and pre-fetches data "E" corresponding to the estimated address D5 from the external memory 120 to the image buffer 115-1 using the memory controller 119.

Afterwards, the rotator 117 transmits an address ADD1=D3 for data "C" to the MMU 115. Here, the data "C" is not present (or stored) in the image buffer 115-1 of the MMU 115, so that a first page miss occurs.

The MMU 115 pre-fetches the data "C" corresponding to the address ADD1=D3 from the external memory 120 to the image buffer 115-1 using the memory controller 119.

Here, the MMU 115 may store a difference between an address D4 for the data "D" and an address D3 for the data "C", i.e., a first depth value, e.g., "4", in the internal memory 203-1 of FIG. 19. Moreover, the MMU 115 may store a first page miss position, e.g., "1", in the internal memory.

The MMU 115 performs a first self-learning using addresses D4 and D3 related to the first page miss and the first page miss position, and generates a first address generation rule using a result of the first self-learning. The MMU 115 may estimate at which position in the first frame of the original image a page miss occurs using the first page miss position.

Accordingly, the MMU 115 may estimate each address using the first address generation rule at each position, e.g., 5, 9, and 13, where a page miss occurs, and pre-fetch each data using the estimated address.

While the data DATA="C" is transmitted to the rotator 117, the MMU 115 estimates a next address D2, and pre-fetches data "B" corresponding to the estimated address D2 to the image buffer 115-1. While the data DATA="B" is transmitted to the rotator 117, the MMU 115 estimates a next address D1, and pre-fetches data "A" corresponding to the estimated address D1 to the image buffer 115-1. While the data DATA="A" is transmitted to the rotator 117, the MMU 115 estimates an address of a previous frame, and pre-fetches data corresponding to the estimated address to the image buffer 115-1.

The rotator 117 transmits an address ADD1=D8 for data "H" to the MMU 115. Here, the data "H" is not present in the image buffer 115-1 of the MMU 115, so that a second page miss occurs.

The MMU 115 pre-fetches the data "H" corresponding to the address ADD1=D8 from the external memory 120 to the image buffer 115-1 using the memory controller 119.

Here, the MMU 115 may store a difference between an address D1 for the data "A" and an address D8 for the data "H", i.e., a second depth value, e.g., "+7", in the internal memory 203-1 of FIG. 19. Moreover, the MMU 115 may store a second page miss position, e.g., "4", in the internal memory.

The MMU 115 may estimate at which position, e.g., 5, 8, 9, 12, 13, and 16, in the first frame OFF of the original image a page miss occurs using the first page miss position, e.g., 1, and the second page miss position, e.g., 4.

The MMU 115 performs a second self-learning using the second depth value and the second page miss position, and generates a second address generation rule using a result of the second self-learning. Accordingly, the MMU 115 may estimate each address using a first address generation rule and a second address generation rule at each position, e.g., 5, 8, 9, 12, 13, and 16, where a page miss occurs, and pre-fetch each data corresponding to each estimated address.

As illustrated in FIG. 6B, in the first frame FF, the MMU 115 transmits each data pre-fetched from the external memory 120 to the image buffer 115-1 to the rotator 117 according to the address access order "1" to "16".

Accordingly, each data output from the MMU 117 is transmitted to the display 130 through the image processing module 118 and the display controller 121. Accordingly, an image processed based on the address access order 1 to 16, i.e., Y-axis rotated image FF, is displayed on the display 130.

While the pre-fetched data DATA="M" is transmitted to the rotator 117, the MMU 115 pre-fetches data "T" corresponding to a next address D20 to the image buffer 115-1 according to a second address generation rule. Accordingly, even if the address D20 is input, a page miss does not occur in the MMU 117.

The MMU 117 pre-fetches data included in a second frame OSF of the original image based on the first address generation rule and the second address generation rule, so that a page miss does not occur in the MMU 115 from the second frame OSF of the original image.

FIGS. 8A and 8B each illustrate an address access order for displaying a 90°-rotated image and a display image according to at least one example embodiment. FIG. 9 is a conceptual diagram for describing address generation rules for generating the 90°-rotated image according to at least one example embodiment.

Referring to FIGS. 1, 2, 3A, 3B, 8A, 8B, and 9, when a user rotates the computing system 100 at 90°, the rotation sensor 140 senses the rotation, and outputs a sensing signal generated according to a result of the sensing to the control signal generator 123. The control signal generator 123 outputs control signals to the CPU 113 in response to the sensing signal.

The CPU 113, in response to the control signals, reads a control value, e.g., 3, stored in the control value table 113-1 shown in FIG. 18 and sets or programs the read control value in the SFR 116 included in the MMU 115.

The control value, e.g., 3, denotes the number of page misses occurring when pre-fetching data included in the first frame OFF of the original image, i.e., the number of address generation rules to be generated in the MMU 115, after the computing system 100 is rotated by 90°.

The MMU 115 performs a self-learning using three page miss positions and differences of addresses related to three page misses, generates three address generation rules using a result of the self-learning, and pre-fetches data from the external memory 120 based on the three address generation rules.

While data "M" is transmitted to the rotator 117, the MMU 115 pre-fetches data "N" corresponding to a next sequential address D14 after the address D13 from the external memory 120 to the image buffer 113-1. When an address ADD1=D9 corresponding to data "I" is input, a first page miss occurs in the MMU 115.

Here, the MMU 115 calculates a difference between addresses D13 and D9, i.e., a first depth value, e.g., "−4", and stores the first depth value and a first page miss position, e.g., "1", in the internal memory 203-1 of FIG. 19. The MMU 115 generates a first address generation rule using the first depth value and the first page miss position.

The MMU 115 pre-fetches each data "I", "E", and "A" corresponding to each address D9, D5, and D1 according to a first address generation rule, and transmits each pre-fetched data "I", "E", and "A" to the rotator 117.

While the data "A" is transmitted to the rotator 117, the MMU 115 pre-fetches data corresponding to an address of a previous frame estimated according to a first address generation rule. When an address ADD1=D14 corresponding to data "N" is input, a second page miss occurs in the MMU 115.

Here, the MMU 115 calculates a difference between addresses D1 and D14, i.e., a second depth value, e.g., "+13", and stores the second depth value and a second page miss position, e.g., "4", in the internal memory. The MMU 115 generates a second address generation rule using the second depth value and the second page miss position.

The MMU 115 may estimate at which position in the first frame OFF of the original image a page miss will occur by using a first page miss position and a second page miss position. Accordingly, the MMU 115 may estimate each address by using the first page miss position and the second page miss position at each position 5, 8, 9, 12, 13, and 16 where a page miss will occur.

According to the first address generation rule, the second address generation rule, and an address access order 5 to 16, the MMU 115 pre-fetches each data "N", "J", "F", "B", "O", "K", "G", "C", "P", "L", "H", and "D" and transmits each pre-fetched data "N", "J", "F", "B", "O", "K", "G", "C", "P", "L", "H", and "D" to the rotator 117.

While the data "D" is transmitted to the rotator 117, the MMU 115 pre-fetches data "Q" corresponding to a next sequential address D17 after an address D4 from the external memory 120 to the image buffer 113-1. When an address ADD1=D29 corresponding to data "c1" is input, a third page miss occurs in the MMU 115.

Here, the MMU 115 calculates a difference (referred to as "a third depth value") between addresses D4 and D29, e.g., "+25", and stores the third depth value and a third page miss position, e.g., "16", in the internal memory. The MMU 115 generates a third address generation rule using the third depth value and the third page miss position.

The MMU 115 may estimate at which position in the second frame OSF of the original image a page miss will occur by using the first address generation rule to the third address generation rule.

Accordingly, the MMU 115 pre-fetches each data corresponding to each estimated address from the external memory 120 to the image buffer 115-1, so that a page miss does not occur in a frame after the second frame OSF of the original image.

As shown in FIG. 8B, the first frame FF includes each data pre-fetched based on the first address generation rule and the second address generation rule. One or more frames after the second frame SF includes each data pre-fetched based on the first address generation rule to the third address generation rule, so that a page miss does not occur.

FIGS. 10A and 10B each illustrate an address access order for displaying a 180°-rotated image and a display image according to at least one example embodiment. FIG. 11 is a conceptual diagram for describing address generation rules for generating the 180°-rotated image according to at least one example embodiment.

Referring to FIGS. 1, 2, 3A, 3B, 10A, 10B, and 11, when a user rotates the computing system 100 at 180°, the rotation sensor 140 senses the rotation and outputs a sensing signal generated according to a result of the sensing to the control signal generator 123. The control signal generator 123 outputs control signals to the CPU 113 in response to the sensing signal.

The CPU 113, in response to the control signals, reads a control value, e.g., 2, stored in the control value table 113-1 shown in FIG. 18, and sets or programs the read control value in the SFR 116 included in the MMU 115.

The control value, e.g., 2, denotes the number of page misses occurring when pre-fetching data included in the first frame OFF of the original image after the computing system 100 is rotated by 180°, i.e., the number of address generation rules to be generated in the MMU 115.

The MMU 115 performs a self-learning using two page miss positions and differences between addresses related to two page misses, generates two address generation rules using a result of the self-learning, and pre-fetches data from the external memory 120 based on the two address generation rules.

While data "P" is transmitted to the rotator 117, the MMU 115 pre-fetches data "Q" corresponding to a next sequential address D17 after an address D16 from the external memory 120 to the image buffer 113-1. When an address ADD1=D15 corresponding to data "O" is input, a first page miss occurs in the MMU 115.

Here, the MMU 115 calculates a first difference between addresses D16 and D15, i.e., a first depth value, e.g., "4", and stores the first depth value and a first page miss position, e.g., "1", in the internal memory 203-1 of FIG. 19. The MMU 115 generates a first address generation rule using the first depth value and the first page miss position.

The MMU 115 may estimate at which position in the first frame OFF of the original frame a page miss will occur by using a first page miss position.

The MMU 115 pre-fetches each data "O", "N", and "M" based on a first address generation rule, and transmits each pre-fetched data "O", "N", and "M" to the rotator 117.

While data "M" is transmitted to the rotator 117, the MMU 115 pre-fetches data "L" based on the first address generation rule.

The MMU 115 pre-fetches each data "L", "K", "J", "I", "H", "G", "F", "E", "D", "C", "B", and "A" based on the first address generation rule, and transmits each pre-fetched data "L", "K", "J", "I", "H", "G", "F", "E", "D", "C", "B", and "A" to the rotator 117.

While last data "A" is transmitted to the rotator 117, the MMU 115 pre-fetches data corresponding to an address of a previous frame. When an address ADD1=D32 corresponding to data "f" is input, a second page miss occurs in the MMU 115.

Here, the MMU 115 calculates a second difference between addresses D1 and D32, i.e., a second depth value, e.g., "+31", and stores the second depth value and a second page miss position, e.g., "16", in the internal memory 203-1 of FIG. 19. The MMU 115 generates a second address generation rule using the second depth value and the second page miss position.

According to the first address generation rule and an address access order "17" to "32", the MMU 115 pre-fetches each data and transmits each pre-fetched data to the rotator 117.

While the data "Q" is transmitted to the rotator 117, the MMU 115 pre-fetches data corresponding to an address of a next frame estimated according to a second address generation rule. Even if the address of the next frame is input, a page miss does not occur in the MMU 115.

As illustrated in FIG. 10B, a first frame FF includes each data pre-fetched according to a first address generation rule. One or more frames after a second frame SF includes each data pre-fetched based on the first address generation rule and the second address generation rule, so that the page miss does not occur.

FIGS. 12A and 12B each illustrate an address access order for displaying an image which is rotated by 90° and then rotated in the X-axis direction and a display image according to at least one example embodiment. FIG. 13 is a conceptual diagram for describing address generation rules for generating the image which is rotated by 90° and then rotated in the X-axis direction according to at least one example embodiment.

Referring to FIGS. 1, 2, 3A, 3B, 12A, 12B, and 13, when a user rotates the computing system 100 at 90°, and then rotates it in a X-axis direction again, the rotation sensor 140 senses the rotation, and outputs a sensing signal generated according to a result of the sensing to the control signal generator 123. The control signal generator 123 outputs a control signal to the CPU 113 in response to the sensing signal.

The CPU 113, in response to the control signals, reads a control value, e.g., 3, stored in the control value table 113-1 illustrated in FIG. 18, and set or program the read control value in the SFR 116 included in the MMU 115.

The control value, e.g., 3, denotes the number of page misses occurring when pre-fetching data included in the first frame OFF of the original image after the computing system 100 is rotated by 90°-, and then is rotated again in the X-axis direction, i.e., the number of address generation rules to be generated in the MMU 115.

The MMU 115 performs a self-learning using three page miss positions and differences between addresses related to three page misses, generates three address generation rules using a result of the self-learning, and pre-fetches each data from the external memory 120 according to the three address generation rules.

While data "P" is transmitted to the rotator 117, the MMU 115 pre-fetches data "Q" corresponding to a next sequential address D17 after an address D16 to the image buffer 113-1. Accordingly, when an address ADD1=D12 corresponding to data "L" is input, a first page miss occurs in the MMU 115.

Here, the MMU 115 calculates a difference between addresses D16 and D12, i.e., a first depth value, e.g., "−4", and stores the first depth value and a first page miss position, e.g., "1", in the internal memory.

The MMU 115 generates a first address generation rule using the first depth value and the first page miss position. Accordingly, the MMU 115 pre-fetches each data "L", "H", and "D" according to an address access order and the first address generation rule, and transmits each pre-fetched data "L", "H", and "D" to the rotator 117.

While data "D" is transmitted to the rotator 117, the MMU 115 estimates a next sequential address after an address D4, and pre-fetches data of a previous frame of an original frame based on a result of the estimation. Accordingly, when an address ADD1=D15 corresponding to data "O" is input, a second page miss occurs in the MMU 115.

The MMU 115 calculates a difference between addresses D15 and D4, i.e., a second depth value, e.g., "+11", and stores the second depth value and a second page miss position, e.g., "4", in the internal memory. The MMU 115 generates a second address generation rule by using the second depth value and the second page miss position.

The MMU 115 pre-fetches each data "O", "K", "G", "C", "N", "J", "F", "B", "M", "I", "E", and "A" according to the first address generation rule, the second address generation rule, and the address access order, and transmits each pre-fetched data "O", "K", "G", "C", "N", "J", "F", "B", "M", "I", "E", and "A" to the rotator 117.

While last data "A" is transmitted to the rotator 117, the MMU 115 estimates a next sequential address D12 after a current address D1 according to the second address generation rule, and pre-fetches data "L" according to a result of the estimation. When an address ADD1=D32 is input, a third page miss occurs in the MMU 115.

Here, the MMU 115 calculates a difference between addresses D1 and D32, i.e., a third depth value, e.g., "+31", and stores the third depth value and a third page miss position, e.g., "16", in the internal memory. The MMU 115 generates a third address generation rule using the third depth value and the third page miss position.

As illustrated in FIG. 12B, a first frame FF includes each data pre-fetched according to the first address generation rule and the second address generation rule.

The second frame SF and a subsequent frame include each data pre-fetched according to the first address generation rule to the third address generation rule, so that a page miss does not occur.

FIGS. 14A and 14B each illustrate an address access order for displaying an image which is rotated by 90° and then rotated in the Y-axis direction and a display image, according to at least one example embodiment. FIG. 15 is a conceptual diagram for describing address generation rules for generating the image which is rotated by 90° and then rotated in the Y-axis direction, according to at least one example embodiment.

Referring to FIGS. 1, 2, 3A, 3B, 14A, 14B, and 15, when a user rotates the computing system 100 by 90°, and then rotates it again in the Y-axis direction, the rotation sensor 140 senses the rotation, and outputs a sensing signal generated according to a result of the sensing to the control signal generator 123. The control signal generator 123 outputs control signals to the CPU 113 in response to the sensing signal.

The CPU 113, in response to the control signals, reads a control value, e.g., 3, stored in the control value table 113-1 illustrated in FIG. 18, and sets or programs the read control value in the SFR 116 included in the MMU 115.

The control value, e.g., 3, denotes the number of page misses occurring when pre-fetching data included in the first frame OFF of the original image after the computing system 100 is rotated by 90°, and then rotated again in the Y-axis direction, i.e., the number of address generation rules to be generated in the MMU 115.

The MMU 115 may perform a self-learning by using three page miss positions and differences between addresses related to the three page misses, generate three address generation rules using a result of the self-learning, and pre-fetch each data from the external memory 120 according to the three address generation rules.

While data "A" is transmitted to the rotator 117, the MMU 115 estimates a next sequential address D2 after a current address D1, and pre-fetches data "B" to the image buffer 113-1 according to a result of the estimation. When an address ADD1=D5 is input, a first page miss occurs in the MMU 115.

Here, the MMU 115 calculates a difference between addresses D1 and D5, i.e., a first depth value, e.g., "+4", and stores the first depth value and a first page miss position, e.g., "1", in the internal memory. The MMU 115 generates a first address generation rule using the first depth value and the first page miss position. Accordingly, the MMU 115 pre-fetches each data "E", "I", and "M" according to an address access order and a first address generation rule, and transmits each pre-fetched data "E", "I", and "M" to the rotator 117.

While data "M" is transmitted to the rotator 117, the MMU 115 estimates a next sequential address D17 after an address D13 based on the first address generation rule, and pre-fetches data "Q" according to a result of the estimation. When an address ADD1=D2 is input, a second page miss occurs in the MMU 115.

The MMU 115 calculates a difference between addresses D13 and D2, i.e., a second depth value, e.g., "−11", and stores the second depth value and a second page miss position in the internal memory. The MMU 115 generates a second address generation rule using the second depth value and the second page miss position.

The MMU 115 pre-fetches each data "B", "F", "J", "N", "C", "G", "K", "O", "D", "H", "L", and "P" and transmits each pre-fetched data "B", "F", "J", "N", "C", "G", "K", "O", "D", "H", "L", and "P" to the rotator 117 based on the first address generation rule, the second address generation rule, and the address access order.

While last data "P" is transmitted to the rotator 117, the MMU 115 estimates a next sequential address D5 after a current address D16 according to the second address generation rule, and pre-fetches data "E" according to a result of the estimation. When an address ADD1=D17 is input, a third page miss occurs in the MMU 115.

Here, the MMU 115 calculates a difference between addresses D16 and D17, i.e., a third depth value, e.g., "+1", and stores the third depth value and the third page miss position, e.g., "16", in the internal memory. The MMU 115 generates a third address generation rule by using the third depth value and the third page miss position.

As illustrated in FIG. 12B, a first frame FF includes each data pre-fetched according to the first address generation rule and the second address generation rule.

A second frame SF and a subsequent frame include each data pre-fetched according to the first to the third address generation rules, so that a page miss does not occur in the MMU 115.

FIGS. 16A and 16B each illustrate an address access order for displaying an image which is rotated by 270° and a display image, according to at least one example embodiment. FIG. 17 is a conceptual diagram for describing address generation rules for generating the image which is rotated by 270°, according to at least one example embodiment.

Referring to FIGS. 1, 2, 3A, 3B, 16A, 16B, and 17, when a user rotates the computing system 100 by 270°, the rotation sensor 140 senses the rotation, and outputs a sensing signal generated according to a result of the sensing to the control signal generator 123. The control signal generator 123 outputs control signals to the CPU 113 in response to the sensing signal.

The CPU 113, in response to the control signals, reads a control value, e.g., 3, stored in the control value table 113-1 illustrated in FIG. 18, and sets or programs the read control value in the SFR 116 included in the MMU 115.

The control value, e.g., 3, indicates the number of page misses occurring when pre-fetching data corresponding to a first frame after the computing system 100 is rotated by 270°, i.e., the number of address generation rules to be generated in the MMU 115.

The MMU 115 may perform a self-learning by using three page miss positions and differences between addresses related to the three page misses, generate three address generation rules using a result of the self-learning, and pre-fetch each data from the external memory 120 according to the three address generation rules.

While data "D" is transmitted to the rotator 117, the MMU 115 estimates a next sequential address D5 after a current address D4, and pre-fetches data "E" to the image buffer 113-1 according to a result of the estimation. Accordingly, when an address ADD1=D8 is input, a first page miss occurs in the MMU 115.

Here, the MMU 115 calculates a difference between addresses D4 and D8, i.e., a first depth value, e.g., "+4", and stores the first depth value and a first page miss position 1 in the internal memory. The MMU 115 generates a first address generation rule by using the first depth value and the first page miss position. Accordingly, the MMU 115 pre-fetches each data "H", "L", and "P" according to an address access order and the first address generation rule, and transmits each pre-fetched data "H", "L", and "P" to the rotator 117.

While the data "P" is transmitted to the rotator 117, the MMU 115 estimates a next sequential address D20 after an address D16 according to the first address generation rule, and pre-fetches data "T" according to a result of the estimation. When an address ADD1=D3 is input, a second page miss occurs in the MMU 115.

The MMU 115 calculates a difference between addresses D16 and D3, i.e., a second depth value, e.g., "−13", and stores the second depth value and a second page miss position, e.g., "4", in the internal memory. The MMU 115 generates a second address generation rule by using the second depth value and the second page miss position.

The MMU 115 pre-fetches each data "C", "G", "K", "O", "B", "F", "J", "N", "A", "E", "I", and "M" based on the first address generation rule, the second address generation rule, and the address access order, and transmits each pre-fetched data "C", "G", "K", "O", "B", "F", "J", "N", "A", "E", "I", and "M" to the rotator 117.

While last data "M" is transmitted to the rotator 117, the MMU 115 estimates a next sequential address after a current address D13, i.e., an address of a previous frame, based on the second address generation rule, and pre-fetches data of the previous frame based on a result of the estimation. When an address ADD1=D20 is input, a third page miss occurs in the MMU 115. The MMU 115 pre-fetches data "T".

Here, the MMU 115 calculates a difference between addresses D16 and D17, i.e., a third depth value, e.g., "+7", and stores the third depth value and the third page miss position, e.g., "16", in the internal memory 203-1. The MMU 115 generates a third address generation rule by using the third depth value and the third page miss position.

As illustrated in FIG. 16B, the first frame FF includes each data pre-fetched according to the first address generation rule and the second address generation rule.

The second frame SF and a sequential frame include each data pre-fetched according to the first address generation rule to the third address generation rule, so that a page miss does not occur.

FIG. 18 is an example embodiment of a control value table including the number of address generation rules determined according to a rotation direction.

The control value table 113-1 includes a control value for each rotation direction. Each control value may also denote a depth value. Each depth value may be set by a manufacturer or a user.

Control values included in the control value table 113-1 illustrated in FIG. 18 are exemplary values for describing the inventive concepts. According to at least one example embodiment, the control value table 113-1 may be embedded in an internal memory of the CPU 113, and loaded in the CPU 113 after being stored in a memory accessed by the CPU 113, and referred by the CPU 113 after being stored in an additional memory.

FIG. 19 is a block diagram of the memory management unit illustrated in FIG. 1. Referring to FIGS. 1 to 19, the memory management unit 115 includes an address conversion circuit 201, a page miss detection circuit 203, a page table 205, an address generation rule generation circuit 207, a pre-fetch circuit 209, the image buffer 115-1, and the SFR 116.

The address conversion circuit 201 performs a function of converting the address ADD1 output from the rotator 117. For example, the address conversion circuit 201 may be embodied in a translation look aside buffer (TLB).

In the same manner as a general TLB, the TLB 201 generates a TLB hit TLB_HIT or a TLB miss TLB_MISS. For example, when a TLB miss TLB_MISS is generated, an address to be converted is acquired from the page table 205, and the acquired address is cached or TLB-written TLB_WR in the TLB 201.

The page miss detection circuit 203 may count the number of the address ADD1 output from the rotator 117 using a counter, calculate a page miss position based on a result of the counting and a page miss PAGE_MISS, store a result of the calculation in the internal memory 203-1, and transmit the stored result of calculation to the address generation rule generation circuit 207.

The address generation rule generation 207 estimates an address of a memory region of the external memory 120 where data to be pre-fetched is stored based on a control value DEPIN stored in the SFR 116, at least one page miss position output from the page miss detection circuit 203, and a converted address (e.g., an address generated according to TLB hit TLB_HIT, an address generated according to TLB miss TLB_MISS, or an address generated according to page miss PAGE_MISS), and generates the estimated address ADD2.

For example, the address ADD1 may include a first address and an offset, and the estimated address ADD2 may include a second address and the offset.

For example, the first address may be a virtual address, and the second address may be a physical address corresponding to the virtual address.

When TLB hit TLB_HIT is generated, the address generation rule generation circuit 207 generates the estimated address ADD2 using an offset and an address output from the TBL 201.

When TLB miss TLB_MISS is generated, the address generation rule generation circuit 207 generates the estimated address ADD2 using an offset and an address acquired from the page table 205.

When the page miss PAGE_MISS is generated, the pre-fetch circuit 209 pre-fetches data DATA_pre to the image buffer 115-1 using the address ADD2 generated according to the TLB miss TLB_MISS, and the address ADD2 for the pre-fetched data is cached or table-written TABLE_WR in the page table 205.

The pre-fetch circuit 209 receives the estimated address ADD2, and transmits the estimated address ADD2 to the memory controller 119. The memory controller 119 reads data from the external memory 120 based on the address ADD2 output from the pre-fetch circuit 209, and transmits the read data DATA_pre, i.e., the pre-fetched data, to the pre-fetch circuit 209.

The pre-fetch circuit 209 transmits the pre-fetched data DATA_pre to the image buffer 115-1. The image buffer 115-1 transmits the pre-fetched data DATA_pre to the rotator 117 as data DATA.

The SFR 116 stores a control value DEPIN transmitted from the CPU 113. The address generation rule generation circuit 207 adjusts the number of address generation rules according to the control value DEPIN.

Referring to FIGS. 4A, 4B, and 19, an operation of the MMU 115 is exemplarily described. For convenience of description in FIGS. 4A and 4B, it is assumed that an address access order is the same as a page miss position.

Whenever an address D13, D14, D15, and D16 for each data "M", "N", "O", and "P" is required, the page miss detection circuit 203 increases the count value. In FIGS. 4A and 4B, it is assumed that the count value is the same as an address access order. For example, the page miss detection circuit 203 may perform a function of a counter which may detect a position where a page miss occurs using the count value.

When the first page miss occurs, the page miss detection circuit 203 calculates a first page miss position based on the count value. Here, the first page miss position is "4", and the "4" is transmitted to the address generation rule generation circuit 207 after being stored in the internal memory 203-1.

The address generation rule generation circuit 207 calculates a first depth value, e.g., "−7", and generates a first address generation rule based on the first depth value and a first page miss position.

For example, the address generation rule generation circuit 207 may estimate a next address using the first depth value, e.g., "−7", at a position, e.g., "8", "12", and "16", corresponding to the first page miss position, and generate the estimated address ADD2.

The page miss detection circuit 203 increases a count value until an address D4 for data "D" is input.

When a second page miss occurs, the page miss detection circuit 203 calculates a second page miss position based on the count value. Here, a second page miss position is "16", and the "16" is transmitted to the address generation rule generation circuit 207 after being stored in the internal memory 203-1.

The address generation rule generation circuit 207 calculates a second depth value, e.g., "+25", and generates a second address generation rule based on the second depth value and the second page miss position.

As illustrated in FIG. 4A, the address generation rule generation circuit 207 generates the estimated address ADD2 according to the first address generation rule and the second address generation rule, so that, when pre-fetching data included in the second frame OSF of the original image, a page miss does not occur.

A method of operating the MMU 115 per rotation direction is substantially the same as a method described referring to FIGS. 4A, 4B, and 19, and as such, a detailed description for these is omitted.

Figure 20:
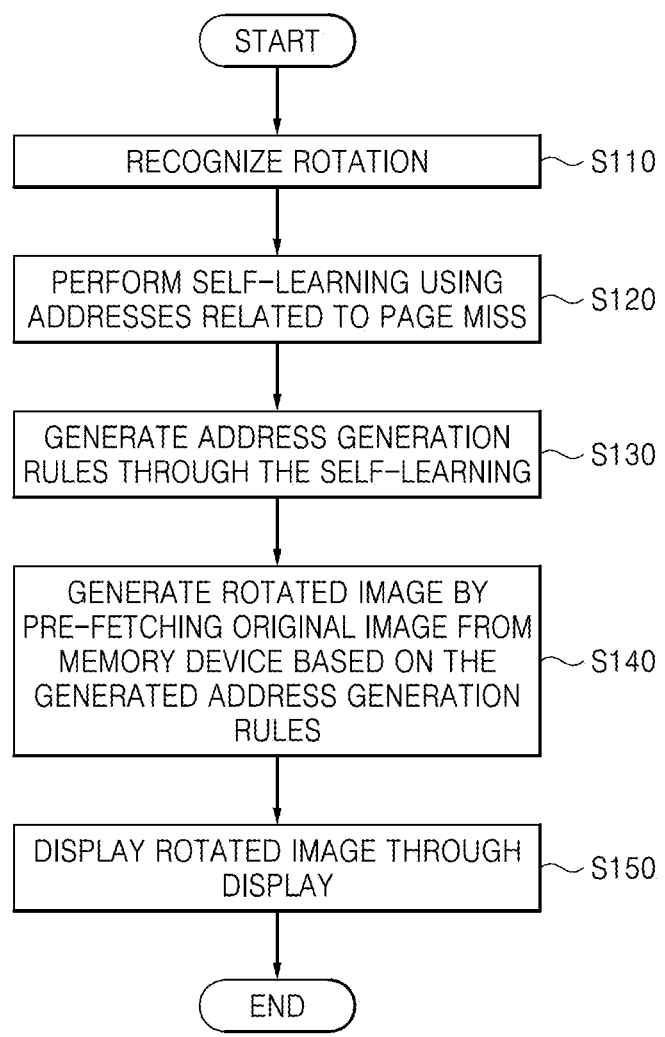
FIG. 20 is a flowchart for describing a method of rotating an original image according to at least one example embodiment of inventive concepts.

FIG. 20 is a flowchart for describing a method of rotating the original image according to at least one example embodiment.

The computing device 110 recognizes (or determines) rotation or a rotation direction of the computing device 110, and outputs control signals corresponding to a result of the recognition to the CPU 113. The CPU 113 programs a control value store in the control value table 113-1 in the SFR 116 of the MMU 115 based on the control signals (S110).

The MMU 115 performs a self-learning using addresses related to at least one page miss (S120).

The MMU 115 generates address generation rules using a result of the self-learning, pre-fetches the original image, i.e., data, from the external memory 120, and transmits the pre-fetched data to the rotator 117 (S 140). That is, the computing device 110 pre-fetches data included in the original image from the external memory 120 based on the address generation rules, and generates a rotated image using the pre-fetched data (S 140).

The computing device 110 displays the rotated image through the display 130 (S 150). When the computing system 110 rotates in a specific direction, i.e., when a direction in which the original image rotates is changed, the MMU 116 initiates the address generation rules previously generated.

A method according to an example embodiment of the inventive concepts and a device performing the method may perform a self-learning using addresses related to a plurality of page misses occurring according to a rotation direction, generates address generation rules using a result of the self-learning, pre-fetches the original image from a memory device based on the address generation rules, and generate the rotated image using the pre-fetched image.

Accordingly, the method and/or the device may reduce an occurrence frequency of page miss. Accordingly, the method and the device may reduce a delay of data processing time depending on an occurrence of the page miss, thereby improving performance of the device.

While inventive concepts have been particularly shown and described with reference to example embodiments thereof, it will be understood by those of ordinary skill in the art that various changes in forms and details may be made therein without departing from the spirit and scope of inventive concepts as defined by the following claims.

What is claimed is:

1. A system on chip (SoC) comprising:
   a processor configured to,
      perform a self-learning using a position of at least one page miss and difference between addresses related to the at least one page miss in a frame, the at least one page miss indicating a mismatch between image data expected to be in an image buffer and image data actually in the image buffer,
      generate address generation rules using a result of the self-learning, and
      pre-fetch an original image from a memory device to the image buffer based on the address generation rules, and
      generate a rotated image using an image pre-fetched to the image buffer.

2. The SoC of claim 1, wherein the processor is configured to determine a number of the address generation rules to be generated according to a direction in which the original image is to be rotated.

3. The SoC of claim 1, wherein the processor is configured to determine a number of the address generation rules to be generated according to a number of page misses occurring in an initial frame of the rotated image.

4. The SoC of claim 1, wherein the processor includes,
   a special function register (SFR) configured to store a control value,
   an address generation rule generation circuit configured to generate the address generation rules based on the control value stored in the SFR, and
   a pre-fetch circuit configured to pre-fetch the original image to the image buffer according to the address generation rules.

5. The SoC of claim 1, further comprising:
   a central processing unit(CPU) configured to control a number of the address generation rules to be generated by the processor in response to control signals indicating a direction in which the original image is rotated.

6. An application processor comprising the SoC of claim 1.

7. The application processor of claim 6, wherein the processor is configured to determine a number of the address generation rules to be generated according to a direction in which the original image is to be rotated.

8. The application processor of claim 6, wherein the processor is configured to determine a number of the address generation rules to be generated according to a number of page misses occurring in an initial frame of the rotated image.

9. The application processor of claim 7, wherein the processor includes,
   a special function register (SFR) configured to store a control value;
   an address generation rule generation circuit configured to generate the address generation rules based on the control value stored in the SFR; and
   a pre-fetch circuit configured to pre-fetch the original image to the image buffer according to the address generation rules.

10. The application processor of claim 7, further comprising:
    a central processing unit (CPU) configured to control a number of the address generation rules to be generated in the processor in response to control signals indicating a direction in which the original image is rotated.

11. A mobile device comprising:
    a memory device configured to store an original image;
    a processor configured to,
       perform a self-learning using a position of at least one page miss and difference between addresses related to the at least one page miss in a frame, the at least one page miss indicating a mismatch between image data expected to be in an image buffer and image data actually in the image buffer, generate address generation rules using a result of the self-learning, and pre-fetch an original image from a memory device to the image buffer according to the address generation rules, generate a rotated image using an image pre-fetched to the image buffer; and transmit the rotated image generated by the rotator to a display.

12. The mobile device of claim 11, wherein the processor is configured to determine a number of the address generation rules to be generated according to a direction in which the original image is rotated.

13. The mobile device of claim 11, wherein the processor is configured to determine a number of the address generation rules to be generated according to a number of page misses occurring in an initial frame of the rotated image.

14. The mobile device of claim 11, further comprising:
a central processing unit (CPU) configured to control a number of the address generation rules to be generated by the processor in response to control signals indicating a direction in which the original image is to be rotated.

15. The mobile device of claim 14, further comprising:
a control signal generator configured to detect the direction in which the original image is to be rotated and generate the control signals according to a result of the detection.

16. The mobile device of claim 14, further comprising:
a rotation sensor configured to detect the direction in which the original image is to be rotated; and
a control signal generator configured to generate the control signals in response to a sensing signal output from the rotation sensor.

17. The mobile device of claim 11, wherein the processor includes,
a special function register (SFR) configured to store a control value,
an address generation rule generation circuit configured to generate the address generation rules based on the control value stored in the SFR, and
a pre-fetch circuit configured to pre-fetch the original image to the image buffer according to the address generation rules.

18. A mobile device, comprising:
a display configured to display a rotated image; and
a computing device configured to,
detect a direction of rotation of the mobile device,
generate address generation rules based on a position of page misses associated with the detected direction of rotation and differences between addresses of the page misses, the page misses indicating a mismatch between image data expected to be in an image buffer and image data actually in the image buffer,
generate the rotated image using an original image according to the address generation rules, and
transmit the rotated image to the display.

19. The mobile device of claim 18, wherein the computing device is configured to generate the address generation rules such that a number of address generation rules is equal to a number of page misses associated with the detected direction of rotation.

20. The mobile device of claim 18, wherein the computing device is configured to generate the rotated image by pre-fetching the original image from a memory device to an image buffer based on the address generation rules.

* * * * *